(12) United States Patent
Saiprabhu et al.

(10) Patent No.: US 12,505,385 B1
(45) Date of Patent: Dec. 23, 2025

(54) GENERATING VISUAL FRAMEWORKS TO EXAMINE RESULTS OF ALGORITHMIC DECISIONS

(71) Applicant: MineSmart Technologies, LLC, Flower Mound, TX (US)

(72) Inventors: Prabhu Saiprabhu, Flower Mound, TX (US); Anika Saiprabhu, Flower Mound, TX (US)

(*) Notice: Subject to any disclaimer, the term of this patent is extended or adjusted under 35 U.S.C. 154(b) by 0 days.

(21) Appl. No.: 18/812,021

(22) Filed: Aug. 22, 2024

(51) Int. Cl.
*G06N 20/00* (2019.01)

(52) U.S. Cl.
CPC .................. *G06N 20/00* (2019.01)

(58) Field of Classification Search
CPC .......... G06N 20/00; G06N 7/06; G06N 5/04; G06N 5/045
See application file for complete search history.

(56) References Cited

U.S. PATENT DOCUMENTS

| | | | |
|---|---|---|---|
| 10,409,782 | B2 | 9/2019 | Zhang et al. |
| 10,565,475 | B2 | 2/2020 | Lecue et al. |
| 11,120,364 | B1* | 9/2021 | Gokalp .................. G06N 20/00 |
| 11,853,853 | B1* | 12/2023 | Beauchesne ........ H04L 63/1433 |
| 2010/0217561 | A1* | 8/2010 | Mills ........................ G01B 5/20 33/553 |
| 2018/0144256 | A1* | 5/2018 | Saxena .................. G06N 20/00 |
| 2021/0034980 | A1 | 2/2021 | Xia et al. |
| 2021/0182698 | A1* | 6/2021 | Le Biannic ............. G06F 16/36 |
| 2021/0334693 | A1* | 10/2021 | Bavly ................ G06F 16/24578 |
| 2023/0289698 | A1* | 9/2023 | Bly .................. G06Q 10/06393 |
| 2023/0351148 | A1* | 11/2023 | Kramer .................... G06N 3/04 |

OTHER PUBLICATIONS

Zhang, Towards a better understanding of the role of visualization in online learning: A review (Year: 2022).*
Keim, Visualization of Streaming Data: Observing Change and Context in Information Visualization Techniques (Year: 2013).*

\* cited by examiner

*Primary Examiner* — Ben M Rifkin
*Assistant Examiner* — Tewodros E Mengistu
(74) *Attorney, Agent, or Firm* — Fogarty LLP

(57) ABSTRACT

A method for generating an interactive visual framework to review decision making of machine learning model analysis. The method can include receiving a set of data related to a scenario, with the set of data having attributes associated with a plurality of parameters. A machine learning algorithm can identify patterns in the attributes, including mapping subsets of the attributes to one or more outcomes of the scenario. The machine learning algorithm can generate a machine learning model based on the identified patterns. The machine learning model can include sets of metadata representing an outcome of the scenario. The machine learning model can identify correlations between the sets of metadata. A node for each metadata and a connection between each node having correlated metadata can be generated. The interactive visual framework can include a chart, with each node positioned on the chart based on the metadata.

20 Claims, 20 Drawing Sheets

| INFERENCE METHOD ID | INFERENCE METHOD | INFERENCE STEP | PATTERN IDENTIFICATION PROCEDURE (1 OF N) | PATTERN IDENTIFICATION PROCEDURE SCORE | PERMUTATION RESULTANT COMPUTATION PROCEDURE (1 OF N) | PERMUTATION RESULTANT COMPUTATION PROCEDURE SCORE | ALGORITHM SELECTION PROCEDURE (1 OF N) | OUTCOME (1 OF N) - ALL ASSOCIATED DATA ATTRIBUTES COMBINED PRODUCE THE OUTCOME |
|---|---|---|---|---|---|---|---|---|
| 1 | DATA ATT2, DATA ATT4 | DATA ATTR2 | PATTERN IDENTIFICATION PROCEDURE ASSOCIATED WITH DATA ATTR2 (1 OF N) | PATTERN IDENTIFICATION PROCEDURE SCORE FOR DATA ATTR2 | PERMUTATION RESULTANT COMPUTATION PROCEDURE FOR DATA ATT2, DATA ATT4 (1 OF N) | PERMUTATION RESULTANT COMPUTATION PROCEDURE SCORE FOR DATA ATT2, DATA ATT4 | ALGORITHM SELECTION PROCEDURE (1 OF N) | OUTCOME (1 OF N) |
| 1 | DATA ATT2, DATA ATT4 | DATA ATTR4 | PATTERN IDENTIFICATION PROCEDURE ASSOCIATED WITH DATA ATTR4 (1 OF N) | PATTERN IDENTIFICATION PROCEDURE SCORE FOR DATA ATTR4 | PERMUTATION RESULTANT COMPUTATION PROCEDURE FOR DATA ATT2, DATA ATT4 (1 OF N) | PERMUTATION RESULTANT COMPUTATION PROCEDURE SCORE FOR DATA ATT2, DATA ATT4 | ALGORITHM SELECTION PROCEDURE (1 OF N) | OUTCOME (1 OF N) |
| 2 | DATA ATT4, DATA ATT2, DATA ATT1 | DATA ATTR4 | PATTERN IDENTIFICATION PROCEDURE ASSOCIATED WITH DATA ATTR4 (1 OF N) | PATTERN IDENTIFICATION PROCEDURE SCORE FOR DATA ATTR4 | PERMUTATION RESULTANT COMPUTATION PROCEDURE FOR DATA ATT4, DATA ATT2, DATA ATT1 (1 OF N) | PERMUTATION RESULTANT COMPUTATION PROCEDURE SCORE FOR DATA ATT4, DATA ATT2, DATA ATT1 | ALGORITHM SELECTION PROCEDURE (1 OF N) | OUTCOME (1 OF N) |
| 2 | DATA ATT4, DATA ATT2, DATA ATT1 | DATA ATTR2 | PATTERN IDENTIFICATION PROCEDURE ASSOCIATED WITH DATA ATTR2 (1 OF N) | PATTERN IDENTIFICATION PROCEDURE SCORE FOR DATA ATTR2 | PERMUTATION RESULTANT COMPUTATION PROCEDURE FOR DATA ATT4, DATA ATT2, DATA ATT1 (1 OF N) | PERMUTATION RESULTANT COMPUTATION PROCEDURE SCORE FOR DATA ATT4, DATA ATT2, DATA ATT1 | ALGORITHM SELECTION PROCEDURE (1 OF N) | OUTCOME (1 OF N) |
| 2 | DATA ATT4, DATA ATT2, DATA ATT1 | DATA ATTR1 | PATTERN IDENTIFICATION PROCEDURE ASSOCIATED WITH DATA ATTR1 (1 OF N) | PATTERN IDENTIFICATION PROCEDURE SCORE FOR DATA ATTR1 | PERMUTATION RESULTANT COMPUTATION PROCEDURE FOR DATA ATT4, DATA ATT2, DATA ATT1 (1 OF N) | PERMUTATION RESULTANT COMPUTATION PROCEDURE SCORE FOR DATA ATT4, DATA ATT2, DATA ATT1 | ALGORITHM SELECTION PROCEDURE (1 OF N) | OUTCOME (1 OF N) |

FIG. 11

| Ref | POHS Dimension | Dimension Value | Dimension Value Measurement Source | Dimension Value Scope of Measurement | Dimension Value Measurement Examples for the Input Attributes Used as Factors in Inference Steps | Normalization Range | Normalized Dimension Value Measurements |
|---|---|---|---|---|---|---|---|
| 1 | Data Concept | Information Gain | Generated By Novel ML Algorithms | Data Attribute Level | Data Att1: 0.4939, Data Att2: 0.2796, Data Att3: 0.1771, Data Att4: 0.0762, Data Att5: 0.0696, | 0-1 | Data Att1:1, Data Att2: 0.4948, Data Att3:0.2533, Data Att4: 0.01555, Data Att5: 0, |
| 2 | Data Alteration | Higher Order Tracking Accuracy (HOTA) | Generated by Feature Extraction or EDA | Data Attribute Level | Data Att1: 92.1, Data Att2:78.44, Data Att3: 67.4, Data Att4: 89.2, Data Att5: 87.4, | 0-1 | Data Att1:1, Data Att2: 0.445, Data Att3:0.0, Data Att4: 0.8826, Data Att5: 0.8097, |
| 3 | Hypotheses Characteristic | Disjunctive Syllogism | Generated by Novel ML Algorithms, Proof Systems, Subject Matter Experts | Inference Methods or at Inferencestreams Levels (Combination of Data Attributes) | (Data Attr1 With Value1 or Data Attr4 with Value 4) and (Not Data Attr4 with Value4) ==> Data Attr 1 With Value1 | 0-1 | 0.5 |

FIG. 19

GENERATING VISUAL FRAMEWORKS TO EXAMINE RESULTS OF ALGORITHMIC DECISIONS

CROSS-REFERENCE TO RELATED APPLICATIONS

Not Applicable.

BACKGROUND

Technical Field

This disclosure generally relates to machine learning models, particularly to analyzing machine learning model decision making.

Description of Related Art

Artificial Intelligence (AI) applications often use Machine Learning (ML) algorithms to identify patterns of factors associated with favorable past behaviors from a large quantity of past behaviors in a process generally known as model training. ML algorithms can create a set of computer files (or databases) from the model training processes and store model artifacts in them. Model artifacts encapsulate specific correlation mechanisms that consume input data and identify patterns to select relevant favorable behaviors. The process that implements the selection of past behavior correlations based on recognized input data patterns does not have to be specifically programmed by a person; rather, it is generated by the ML algorithms themselves. Because of such automatic generation, ML models fail to correlate some inputs to outcomes accurately, characterized by the model accuracy measures. When the model accuracy measures deviate from predetermined ranges, corresponding ML models are replaced with updated models that were trained with evolving input data. This cycle continues as business conditions evolve. Complex problems are generally tackled through multiple ML models that are generated from multiple training data and ML algorithms.

Current ML models respond to environment stimuli in a manner where the recognition of patterns in input data and determination of associated behavior are not discernable until the outputs are generated. Because of this feature, ML models are said to operate in monolithic and black box fashion. When multiple ML models are needed to solve complex problems, the monolithic and black box nature of them become more pronounced. This lack of transparency of algorithmic decisions require external applications to be built to consolidate the decisions, resolve conflicts and apply other requirements such as compliance and ethical policies. As upstream ML models evolve the downstream external applications must be updated to accommodate changes.

BRIEF SUMMARY

This summary provides a discussion of aspects of certain embodiments of the invention. It is not intended to limit the claimed invention or any of the terms in the claims. The summary provides some aspects but there are aspects and embodiments of the invention that are not discussed here.

In one aspect, a method for generating an interactive visual framework to review decision making of machine learning model analysis is provided. The method can include receiving a set of data related to a scenario, with the set of data having attributes associated with a plurality of parameters. A machine learning algorithm can identify patterns in the attributes, including mapping subsets of the attributes to one or more outcomes of the scenario. The machine learning algorithm can generate a machine learning model based on the patterns identified in the set of data. The machine learning model can include sets of metadata, with each set of metadata representing an outcome of the scenario. The machine learning model can identify correlations between the sets of metadata. A node for each metadata and a connection between each node having correlated metadata can be generated. The interactive visual framework can be generated, including a chart having multiple axes. Each node can have a position on the chart based on the metadata.

In one embodiment, a first machine learning algorithm and a second machine learning algorithm identify patterns in the attributes. The first machine learning algorithm can generate a first machine learning model, and the second machine learning algorithm can generate a second machine learning model.

In another embodiment, a third machine learning algorithm identifies patterns in the attributes. The third machine learning algorithm can generate a third machine learning model. After generating the first machine learning model, the second machine learning model, and the third machine learning model, metadata of each machine learning model can be collected in a machine learning model ecosystem. After generating the interactive visual framework, the interactive visual framework can be presented for review, including receiving changes to metadata. In response, a revised interactive visual framework can be generated based on the changes to the metadata.

In another embodiment, the chart includes a first axis, a second axis, and a third axis, with each axis based on predetermined characteristics.

In yet another embodiment, a desired outcome can be identified based on a collection of nodes interconnected with markings. The method can also include receiving a notification concerning an inconsistency with the metadata associated with the collection of nodes. In response, a second marking reflecting the inconsistency can be generated.

In another embodiment, after generating the interactive visual framework, the interactive visual framework can be presented for review, including receiving changes to metadata. After presenting the interactive visual framework for review, a revised interactive visual framework can be generated based on the changes to the metadata.

In another aspect, a non-transitory computer readable medium for generating an interactive visual framework to review decision making of machine learning model analysis is provided. One or more processors can execute instructions causing the one or more processors to receive a set of data related to a scenario, with the set of data having attributes associated with a plurality of parameters. The one or more processors can identify, via a machine learning algorithm, patterns in the attributes. The machine learning algorithm can map subsets of the attributes to one or more outcomes of the scenario. The one or more processors can generate, via the machine learning algorithm, a machine learning model based on the patterns identified in the set of data. The machine learning model can include sets of metadata, with each set of metadata representing an outcome of the scenario. The machine learning model can identify correlations between the sets of metadata. The one or more processors can generate a node for each metadata, a connection between each node having correlated metadata, and the interactive visual framework. The interactive visual framework can include a chart having multiple axes, with each node has a position on the chart based on the metadata.

In another embodiment, the one or more processors can identify, via a first machine learning algorithm and a second machine learning algorithm, patterns in the attributes. The first machine learning algorithm can generate a first machine learning model, and the second machine learning algorithm can generate a second machine learning model.

In another embodiment, the one or more processors can identify, via a third machine learning algorithm, patterns in the attributes. The third machine learning algorithm can generate a third machine learning model. After generating the first machine learning model, the second machine learning model, and the third machine learning model, the one or more processors can collect the metadata of each machine learning model in a machine learning model ecosystem. After generating the interactive visual framework, the one or more processors can present the interactive visual framework for review, including includes receiving changes to metadata. Additionally, the one or more processors can generate a revised interactive visual framework based on the changes to the metadata.

In another embodiment, the chart comprises a first axis, a second axis, and a third axis, further wherein each axis is based on predetermined characteristics.

In yet another embodiment, after generating the interactive visual framework, the one or more processors can identify a desired outcome based on a collection of nodes interconnected with markings. Additionally, the one or more processors can receive a notification concerning an inconsistency with the metadata associated with the collection of nodes. In response, the one or more processors can generate a second marking reflecting the inconsistency.

In another embodiment, after generating the interactive visual framework, the one or more processors can present the interactive visual framework for review, including receiving changes to metadata. Additionally, after presenting the interactive visual framework for review, the one or more processors can generate a revised interactive visual framework based on the changes to the metadata.

BRIEF DESCRIPTION OF THE DRAWINGS

The preceding aspects and many of the attendant advantages of the present technology will become more readily appreciated by reference to the following Detailed Description when taken in conjunction with the accompanying simplified drawings of example embodiments. The drawings briefly described below are presented for ease of explanation and do not limit the scope of the claimed subject matter.

FIG. 11 depicts a table of inferencestream permutations.

FIG. 19 depicts a table of normalized data alteration dimension values.

DETAILED DESCRIPTION

Figure 1:
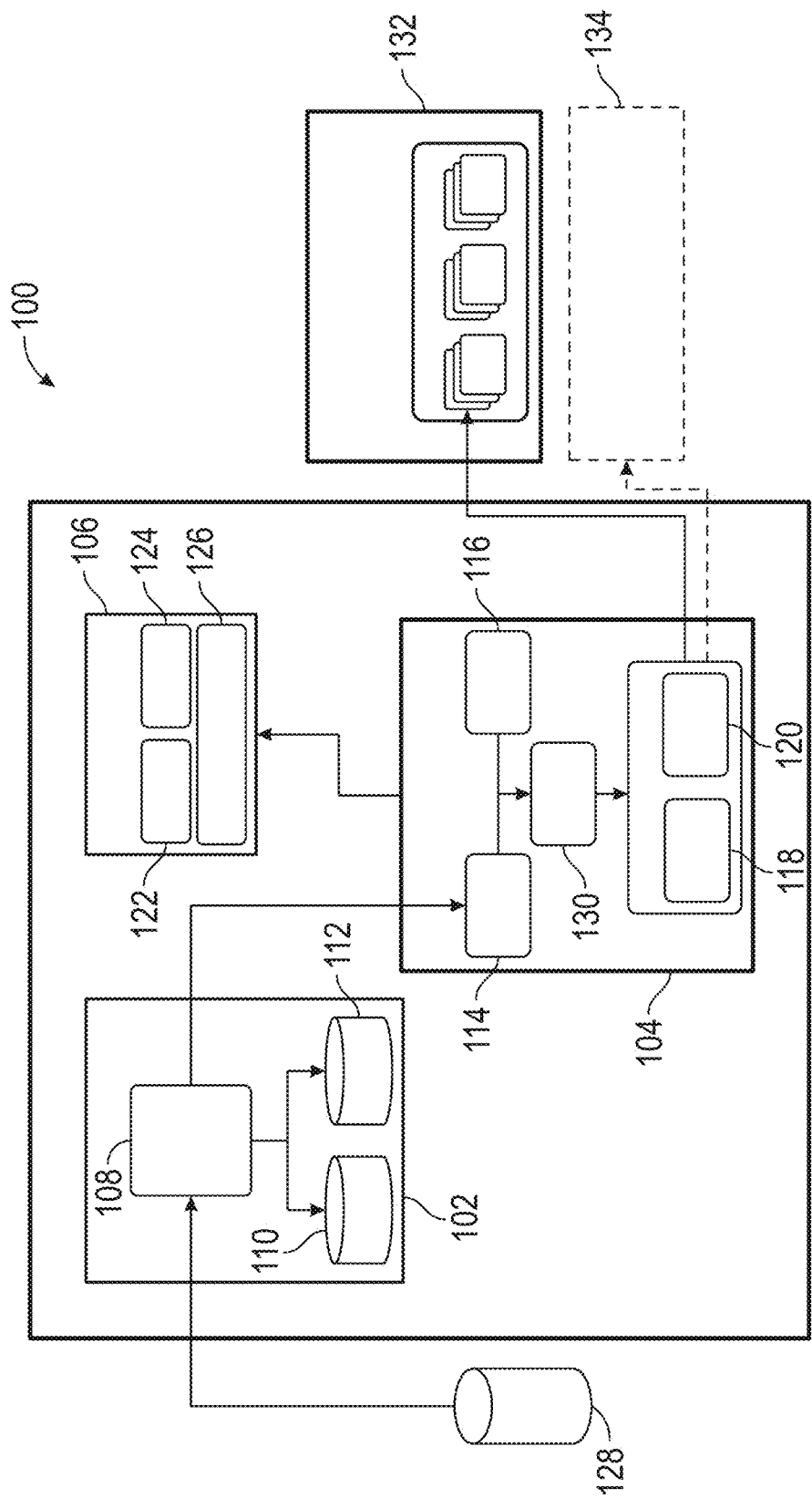
FIG. 1 depicts a diagram of an overview of an embodiment of an implementation described herein.

FIG. 1 depicts a diagram 100 for generating a visual framework to examine the results of machine learning algorithmic decisions. In the depicted diagram 100, a first platform 102 receives a set of training data from one or more external training databases 128 and one or more user prompts to produce inference methods. An example of inference methods may be taking a subset of data and identifying when the subset satisfies a predetermined condition (e.g., falls within a range or matches a value). The first platform 102 employs machine learning algorithms (ML algorithms) 108 to identify one or more combinations of input data attributes and value ranges that are correlated to outcomes, some of which may be desired by a user. The ML algorithms 108 of the first platform 102 can operate in different ways and each can use specialized mapping of input data attributes and value ranges to the outcome classes. Once the first platform 102 has established the mappings, the data are translated into inference methods. In some examples, each form of inference method can require specific information.

Inference methods can be created in multiple forms, including rules, knowledge representation constructs, logic formulae, and custom deployment. Rules can take the form of condition and action pairs, such as certain actions being taken when conditions are met. Conditions can reflect input data attributes, and their values and actions reflect derived intermediate information or final conclusion that are shared with external consumers.

Knowledge representation constructs can use cohesive data structures that reflect the state of items of interest, such as temporal state of attributes, accumulation of measures, etc., with which the rules can direct the algorithmic decision paths. The knowledge representation facility will allow external governance overrides to be included in a similar manner as that generated by the algorithms to guide algorithmic decisions.

Logic formulae-based representation can use various forms of logic such as propositional, predicate, first order logic, and higher order logic. The logic formulae representation can be used with external theorem provers 130 to validate consistency of learned and imparted knowledge irrespective of their origin. In addition, the logic formulae can be advantageous for creating/deducing additional knowledge in a consistent manner.

Inference methods for custom deployment can be utilized with multiple target platforms (132, 134), such as, for example, JADE, SOAR, ACT-R based cognitive architecture platforms and neuromorphic computing.

The ML algorithms 108 of the first platform 102 can identify a relational datastore (or database) 110 that houses metadata. Metadata can include data attributes and associated data measures from input data, computational criteria used by the ML algorithms that can create all forms of inference methods defined above, and details of input information. It is advantageous to utilize metadata from a relational datastore (or database) 110 because training tasks tend to be resource intensive and the metadata will help downstream processes to be efficient and also assist trouble shooting. ML algorithms can create a set of computer files from model training processes in a relational datastore (or database) 110 and store model artifacts in them. Model artifacts can encapsulate specific mechanisms that consume input data and identify patterns to select relevant favorable behaviors. The ML algorithms can also store transient data in a separate internal workspace 112.

ML generated knowledge 114 is created in the form of inference methods described above and the knowledge organization leverages them to efficiently serve out creation of agents and additional knowledge to create a knowledge base system within platform 104. Agents may include software processes, such as decision processes that will use a sequence of inferences and solves business problems. Some non-limiting example scenarios are described below.

In a first example, when operational/input events trigger inference methods, depending on the effect of their execution, additional downstream inference methods may be triggered and may form a chain—e.g., inferencestreams—where larger and unforeseen problems can be addressed. Inferencestreams can be composed from different inference methods that are generated by different ML algorithms that use different functional data and/or domain knowledge. Inferencestreams can also be composed from other inferencestreams, which can indicate realistic operational behaviors. Relevant operational context data, sequences of rule executions, proof-steps, and other information are captured to reflect examples of inferencestream metadata. A semantic network can be used to reflect the inferencestreams metadata and supports additional analyses. Moreover, metadata from such representation can promote subsequent learning processes.

In a second example, as new inferencestreams are composed (e.g., in an event-driven manner or otherwise), corresponding values of Pattern of Hypotheses Selection (POHS) dimensions (alternatively referred to as viewpoints) are gathered to enable stakeholder reviews. Even though inferencestreams can be naturally composed due to events, inferencestreams still may need to be examined for potential issues, bias-harms, risks and additional opportunities.

In a third example, in addition to data/event driven composition of inferencestreams, custom creation of inferencestreams (e.g., such as based on rehearsals and what-if scenario inferencestreams) may be created to allow for operational and compliance guardrails verification. This process may result in multiple semantic network structures and the intersection of inferencestreams from multiple drivers, such as operational events, rehearsals, what-if scenarios can result in additional knowledge.

In a fourth example, inferencestream metadata can indicate operational realities that may be different than what the training data alone indicates. Accordingly, such data can be used by the ML algorithms themselves to create additional inference methods.

In a fifth example, inferencestream metadata in combination with logical forms of the inference methods can be used by theorem provers 130 to generate additional knowledge via logical derivations. Theorem provers 130 may be localized or external from the platforms (e.g., 102 or 104). Logically deduced knowledge can begin as a hypothesis and once verified by data using ML algorithms or by domain axioms, they can be incorporated for operational use.

Domain axioms 116 (e.g., common knowledge or fundamental truths) can be represented in the same forms as ML algorithm generated knowledge 114. A visual tool can present associations, conflicts with prior axioms, and prior learned knowledge as new axioms are provided by human experts. Algorithmic decision transparency can form a basis to allowing domain experts to incorporate compliance and operational guardrails in the same mechanisms as ML generated knowledge 114.

As the knowledge base system matures, certain inferences can be promoted as innate inference faculty 118, where they will have wider impact. For example, in shared inferences, a configurable criterion can be defined—e.g., degree-of-sharing—and can be used to identify inference methods that are common to many inferencestreams. Examples may include public information such as, but not limited to, business/enterprise-wide compliance, policies, etc. The degree-of-share measure can allow hierarchical organization, where subunits of a business can define policies and compliance rules that are specific to their operations yet aligning to the overall business wide compliance and policies.

In another example, propositional, predicate, and high order logical derivation methods can be implemented as pre-configured innate inferences. Examples can include truth tables, modern and traditional squares of opposition, etc.

In yet another example, with commercial innate inferences, business domain oriented innate knowledge can be exchanged among collaborating businesses. For example, there could be retail innate knowledge or legal innate knowledge, transportation innate knowledge, etc.

Additionally, as the knowledge base 104 matures, any knowledge that is not classified as innate inference faculty can be organized into functional primary linguistics data (PLD) 120. The functional PLD 120 can differentiate the scope of application of the knowledge, such as sub-units of a business, sub-unit specific facts and contexts, separate collaboration among sub-units, etc. This organization is advantageous because it can limit impacts such as operational disruptions, knowledge change management, etc.

Hypotheses that are implemented as inference methods and inferencestreams can be visualized in a display 106 to enable consistent analyses across stakeholders with no translations of information to suit their roles, such as technical, subject matter expertise, operations, etc. Inferences can be placed in an interactive 3D visualization. The POHS dimensions 122 can correspond to configurable aspects of how the ML algorithms compose the inference methods, which can form the basis of algorithmic decision transparencies. Prebuilt dimensions/viewpoints can include: hypotheses characteristics, data concepts and data alterations. ML algorithms can internally assign the hypotheses characteristics and data concepts dimension values based on how they select and correlate, validate and compose the inference methods. Data Scientists and Data Engineers assign the data alteration dimension values or obtain them from Extract, Transform and Load (ETL) metadata, which brings out tribal knowledge that is often used, but not formalized in examining algorithmic decisions. Additional POHS dimensions can be defined by Data Scientists, Data Engineers, Operations and Governance teams to suit their work culture. However, at a given instance only three of them are used in the visualization. To manage domain axioms, Data Scientists, Data Engineers, Operations and Governance teams will be provided with factors that will be translated into dimension values.

Figure 2:
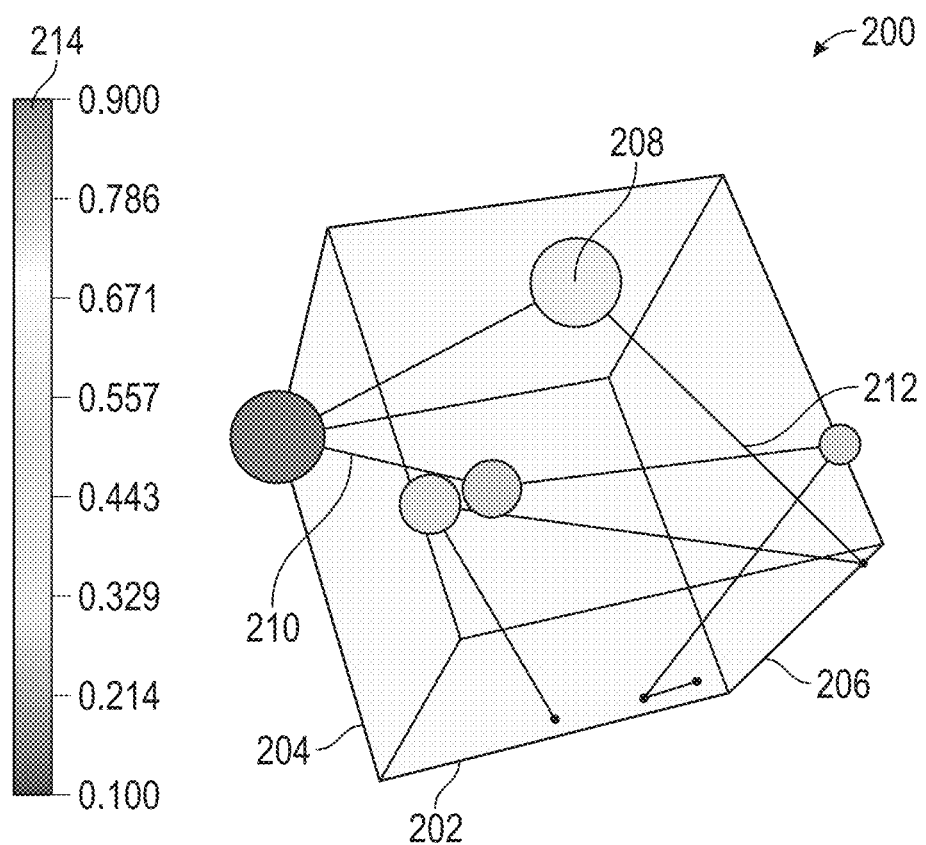
FIG. 2 depicts an illustrative embodiment of an interactive visual framework.

In FIG. 2, a visualization 200 of the hypotheses (implemented as inferencestreams) is rendered through the information generated by the novel ML algorithms. The visualization 200 is an interactive 3-D visualization. The hypotheses can be indicated as nodes 208 connected by links 210, 212, both having a visual indicator. The nodes may comprise spheres, circles, or any other shape or structure. The visual indicator may comprise colors. The links may comprise solid or dashed lines with different thickness. The links may comprise colors. Different hypotheses can share nodes and links indicating common inference steps that they can take while composing an algorithmic decision associated with the hypothesis. The nodes and links can be placed in a 3-dimensional space that is defined by dimensions/viewpoints—e.g., Hypotheses characteristics 206, Data Alterations 202, and Data Concepts 210. Items that belong to the dimension can be listed in a legend and mapped to an importance score 214 that is shown in the visualization 200. This is advantageous as, visually, all inference steps that are identified by ML algorithms to validate a hypothesis can be examined using visual indicators for nodes and links along the dimensions/viewpoints. When shared inference steps (nodes) are placed on different scale of the same viewpoint/dimension axis, the visual examination of nodes and links can be instrumental in allowing stakeholders to further investigate and validate the differences to be acceptable or not. The visual indicators of nodes can inform stakeholders of factors from that viewpoint/dimension that contribute to the difference. Similarly visual indicators of links can inform stakeholders how the factors' contribution difference influences the connections to other nodes.

With reference to FIG. 1, dimension values can be normalized to a consistent scale so that the visualization generated by in the display 106 will place the inferences for examination accurately. The normalization factors are configurable and the visual scale can indicate how the inferences are aligned. The interference alignment 124 is important to the overall visualization, where cluster analyses can guide stakeholders to examine risks of algorithmic decision steps proactively. Stakeholders can use the inference alignment 124 to identify compliance and operational gaps, examine risks and explore mitigation strategies, etc. When normalized factors contribute to the difference they can surface potential issues, that are otherwise hard to discern.

Inferencestreams will be examined using the POHS interactive 3D visualization. Based on such examinations, additional inferencestreams can be composed 126 to address inconsistencies, evolving conditions, compliance gaps etc. Also, it is feasible to refine the composition of inferencestreams 126 using the dimension/viewpoints metadata.

Process Summary

Figure 3:
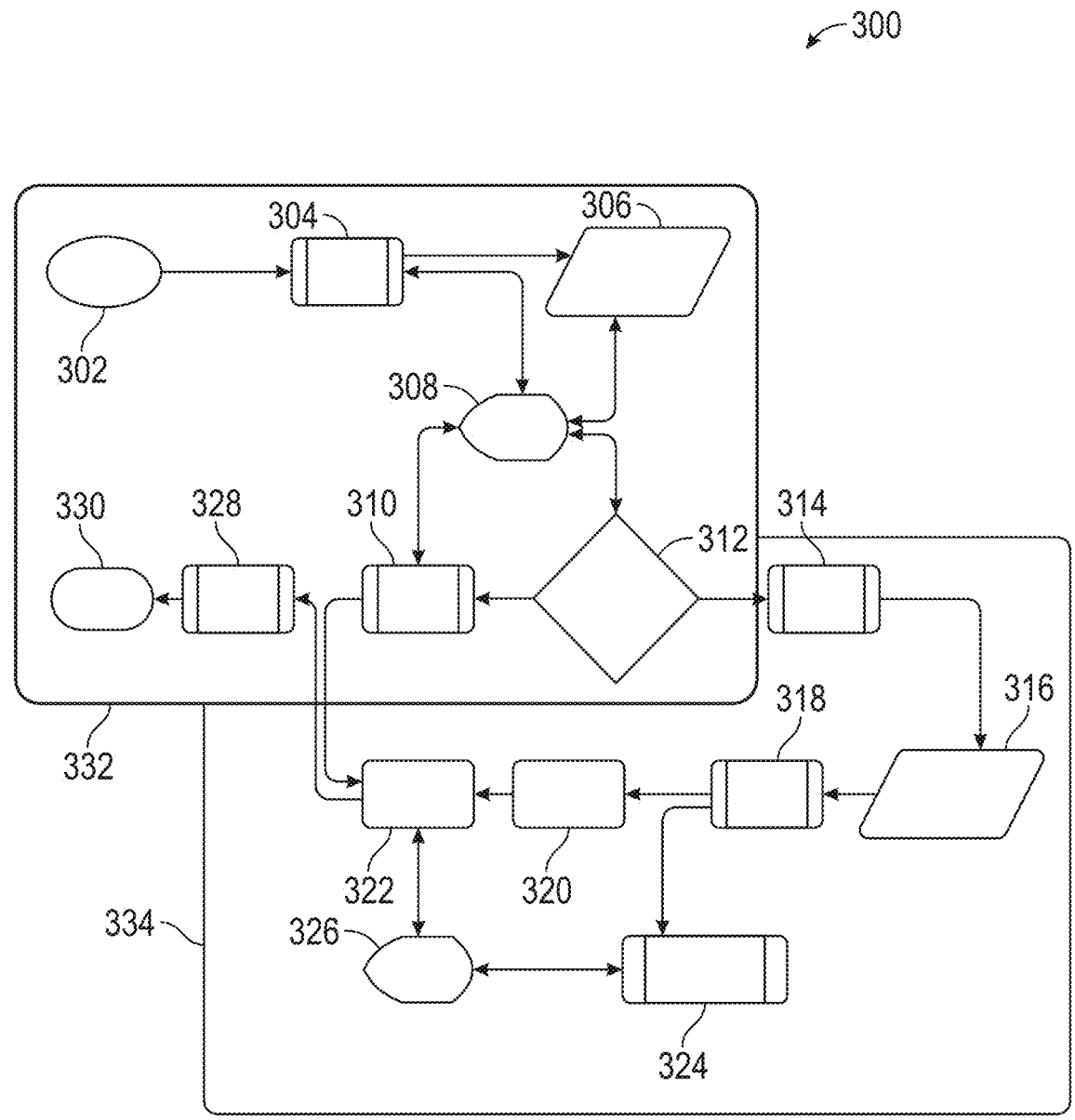
FIG. 3 depicts a diagram of an illustrative embodiment of a process for generating, organizing, managing and examining information through an interactive visual framework.

Turning to FIG. 3, a diagram 300 of an embodiment of a process for generating, organizing, managing and examining both ML generated and subject matter experts imparted knowledge through a visual framework is depicted. The process 300 begins with one or more hypotheses gathered at step 302 that can include a set of hypotheses parameters. Hypotheses parameters can include the following: 1) Hypotheses outcome attributes, 2) Hypotheses drivers (input attributes), 3) Potential data sources and attributes to be researched, 4) Potential types of ML algorithms to be considered, and 5) Functional or Business focus.

The process 300 can continue to step 304, where a knowledge base can be utilized through POHS GUI at step 308 to obtain current state analyses of the hypotheses through its parameters, which can produce metadata. The process 300 can continue to step 306 where inference method metadata associated with hypotheses parameters is examined through POHS GUI from step 308. The step POHS GUI 308 can be used to support steps 304, 306, 312 and 310. The process 300 can continue to step 312, where an evaluation is made if the hypotheses can be solved using the existing inference methods. This examination can be accomplished through simple reviews of the inference methods or validating them in the computer system itself. If the hypotheses can be resolved based on the examination at step 312, the process 300 can continue to step 310, where formal inferencestreams that can solve the hypotheses are created and verified. Then the process 300 can continue to step 322 where the formal inferencestreams are reviewed in conjunction with results. Step 322 can be accomplished using the POHS GUI from step 326. From step 322 the process 300 can continue to step 328 where reviewed inference steps that address the hypotheses from step 320, can be deployed into computers at production system where the business will formally use the inferencestreams to meet the hypotheses needs at step 330. An alternative within the process 300 can happen at step 312, where if existing inferencestreams are not sufficient to address the needs of the hypotheses that were initiated in step 302. The alternate flow of the process 300 from step 312 examination can continue to step 314, where specific gaps in the inferencestreams in meeting the hypotheses condition are finalized. Then the process 300 can continue to step 316, where the gaps are used to identify data sources that need to be used in training to derive gap addressing inferencestreams and specific ML algorithms that are needed to process the training data. Then the process 300 can continue to step 318, where the identified ML algorithms are executed on the training data to derive both inference methods and POHS dimension values. The process 300 then can continue to step 324 where POHS dimensions values are reviewed and finalized using the POHS GUI from step 326. Simultaneously the process 300 can continue from step 318 to step 320 where new inferencestreams are created from the inference methods from step 318. Then the process 300 can continue to step 322 where, as previously described, the formal inferencestreams are reviewed in conjunction with results. Thus, the process 300 can result in inferencestreams creation to solve the hypotheses.

Figure 4:
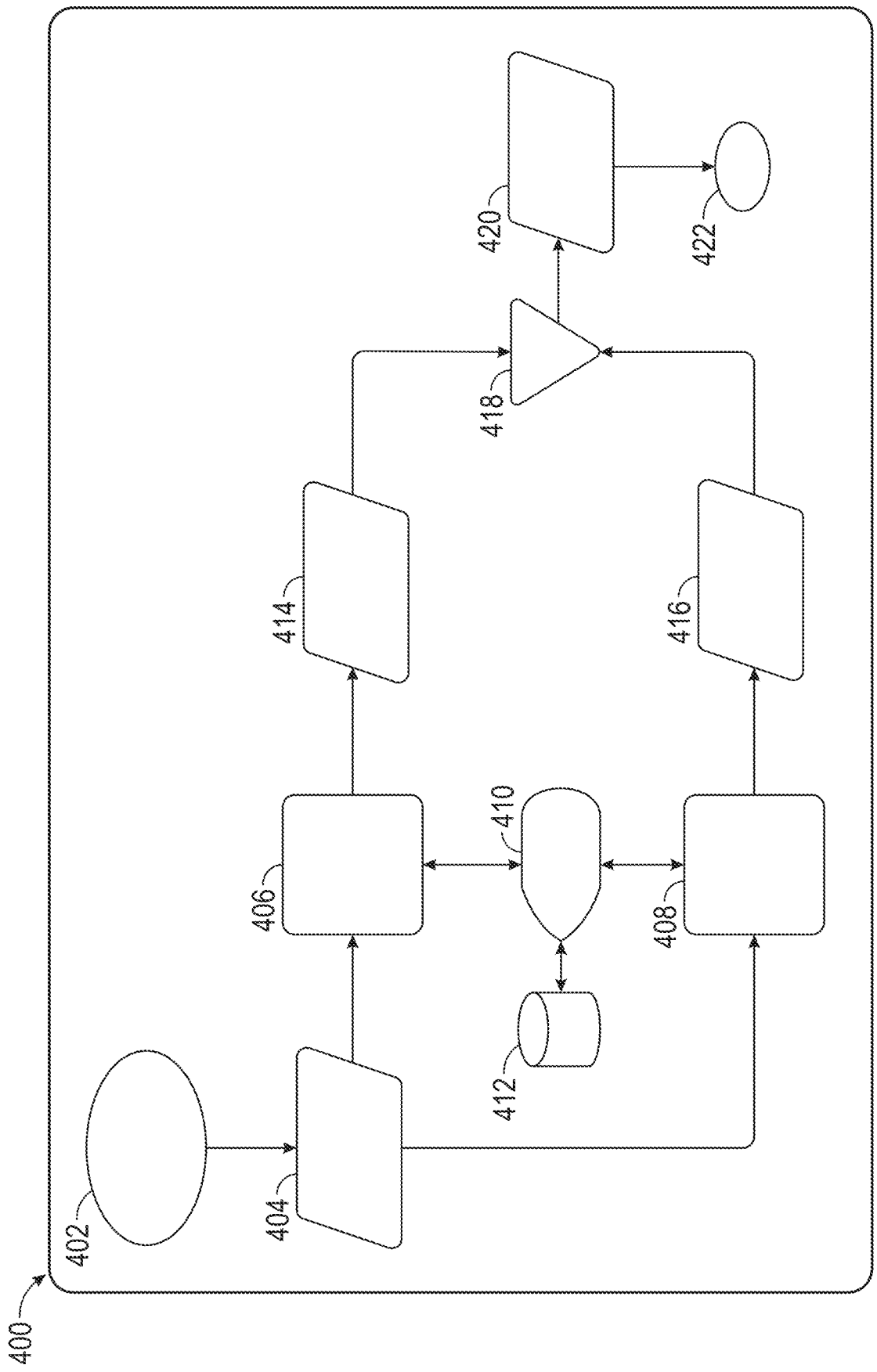
FIG. 4 depicts a diagram of an illustrative embodiment of a process for using a knowledge base.

With reference to FIG. 4, an example detailed diagram of a process 400 in step 304 is illustrated. The process 400 begins at step 402 with generating hypotheses parameters that are analyzed with a knowledge base to determine one or more attributes. For example in step 404, the knowledge base can persist hypotheses outcome attributes, hypotheses drivers (e.g., inputs), data attributes (and/or potential data sources), potential ML algorithms, and function (or business) focus attributes. The process 400 then can continue to step 406 where hypotheses outcomes are used to locate inferences from the POHS knowledge base (POHS KB) from step 412 using the POHS GUI from step 410. Then the process 400 can continue to step 414, where the resulting inferencestream metadata can suggest how hypotheses outcome are derived. Simultaneously the process 400 can continue to step 408, where inferences and inferencestreams that consume hypotheses inputs are identified. Then the process 400 can continue to step 416 where the inference methods suggest how inputs attributes are handled to either make hypotheses outcomes directly, indirectly, or partially. Then the process 400 can continue from both steps 414 and 416 to the step 418, where inference methods that handle hypotheses inputs and produce hypotheses outcomes are consolidated. Then process 400 can continue to step 420 where the consolidated inference metadata is provided is persisted and ending at step 422.

Figure 5:
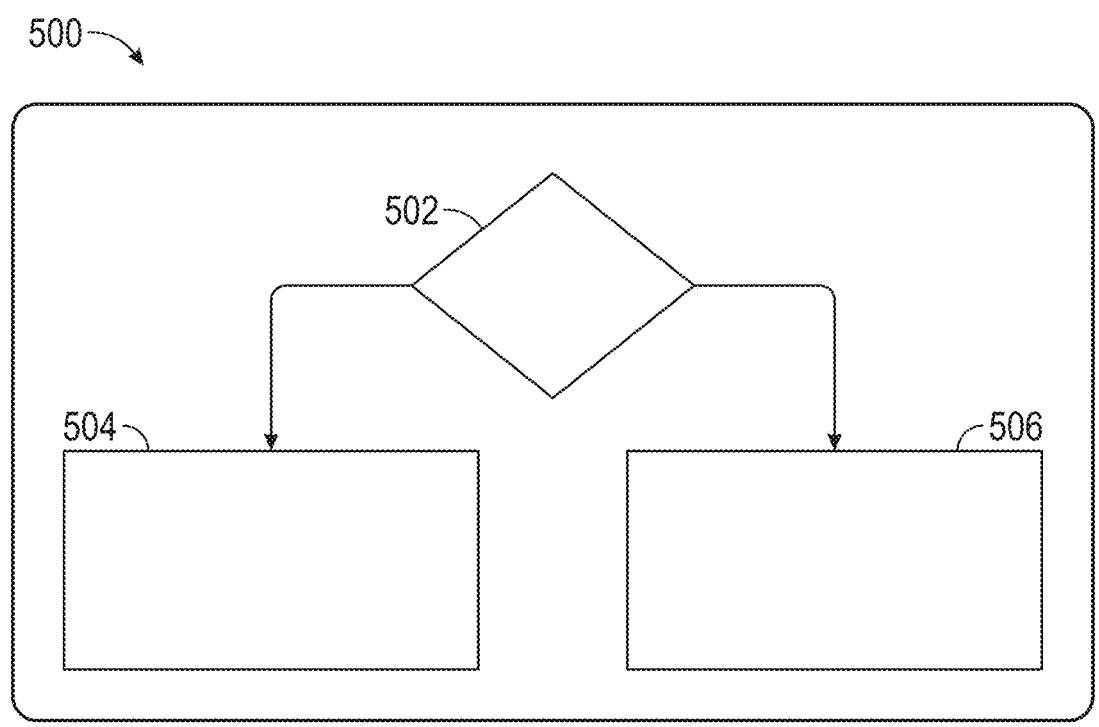
FIG. 5 depicts a diagram of an illustrative embodiment of a process for evaluating inferencestreams.

Turning to FIG. 5 a detailed diagram of a process 500 in step 312 is illustrated. The process 500 begins at step 502 where sufficient support conditions from the inference steps in meeting the hypotheses outcomes are evaluated. Then the process 500 can continue to step 504 where inference streams that handle the hypotheses inputs and those that generate the hypotheses outcomes can be connected without any additional inference steps. These are called Direct Support at step 504. In addition, inferencestreams that handle the hypotheses inputs and those that generate the hypotheses outcomes can be connected with additional inferences, thereby still accomplishing the hypotheses outcomes. These are called Indirect Support at step 504. Alternately the process 500 can continue from step 502 step 506, where, inferencestreams that handle the hypotheses inputs and those that generate the hypotheses outcomes cannot be connected, without additional generation of inferences from training data. These are called Partial Support. In addition, there can be no inferencestreams that handle the hypotheses inputs and generate hypotheses outcomes and this condition is called as No Support.

Figure 6:
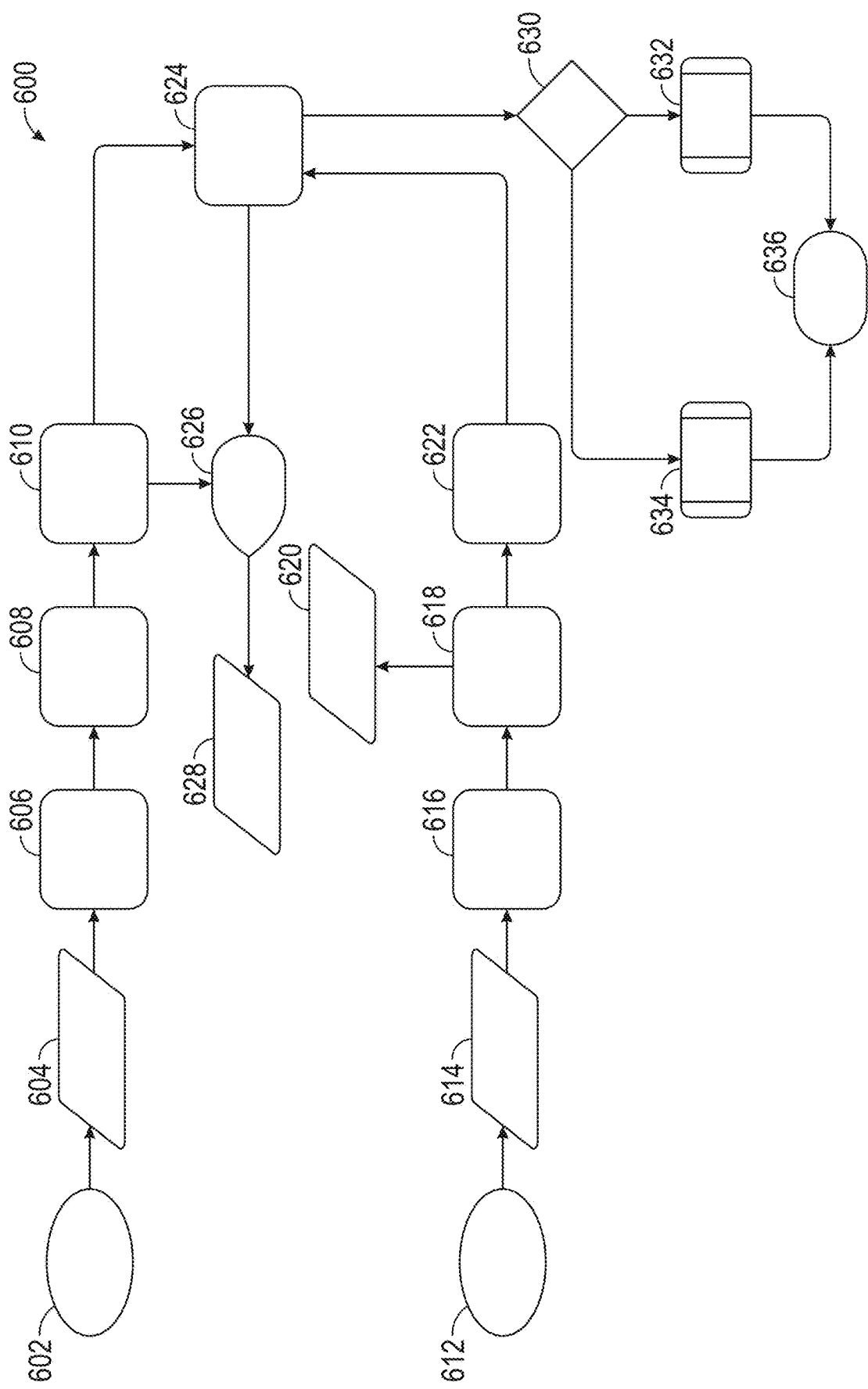
FIG. 6 depicts a diagram of an illustrative embodiment of a process for creating additional inferencestreams.

Turning to FIG. 6, a detailed diagram of a process 600 in step 310 is illustrated. The process 600 begins at step 602 where the inferencestreams that handle the hypotheses inputs and those that generate the hypotheses outcomes can be connected without any additional inference steps, called Direct Support, are gathered. Then process 600 can continue to step 604 where the Direct Support inference methods are organized into suitable forms and persisted. The process 600 then can continue to step 606, where certain updates to the operations of the Direct Support inferences and manual compliance guardrails can be identified, including outcomes from prior operations of these Direct Support inferences in any other operational scenario. The process 600 can then continue to step 608, where approved Direct Support inference methods are incorporated in to operational test environment. The process 600 then can continue to step 610 where rehearsals (testing) of Direct Support inferences care carried out using appropriate scenarios and POHS inputs are compiled. POHS GUI from step 626 is used in the add/review and persistence of POHS information in step 628 as needed in step 610. The process 600 simultaneously can begin at step 612 where inferencestreams that handle the hypotheses inputs and those that generate the hypotheses outcomes can be connected with additional inferences, thereby accomplishing the hypotheses outcomes called Indirect Support is gathered. Then process 600 can continue to step 614 where the Indirect Support inference methods are organized into suitable forms and persisted. The process 600 then can continue to step 616, where certain updates to the operations of the Indirect Support inferences identified, gap connecting inferencestreams identified, manual compliance guardrails identified, including outcomes from prior operations of these Indirect Support inferences in any other operational scenario. The process 600 can then continue to step 618, where new Indirect Support inference methods identified are created with metadata capture facilities and persisted in step 620. The process 600 then can continue to step 622 where Indirect Support inferencestreams along with metadata facilities are incorporated into operational test environment. The process 600 then can continue to step 624 where rehearsals (testing) of Indirect Support inferences are carried out using appropriate scenarios and POHS inputs are compiled. POHS GUI from step 626 is used in the add/review of POHS information in step 628 as needed in step 624. In addition, step 624 also combines both Direct Support and Indirect Support inferences. The process 600 then can continue to step 630, where stakeholders will review the consolidated rehearsal reviews from both Direct and Indirect support inferences. If the reviews are acceptable the process 600 then can continue to step 632 where the combined inferences are deployed into operations. The process 600 then can end at step 636. Alternately, if the review results are not acceptable at step 630 the process 600 then can continue to step 634 where gaps from rehearsals are identified. The process 600 then can end at step 636.

Figure 7:
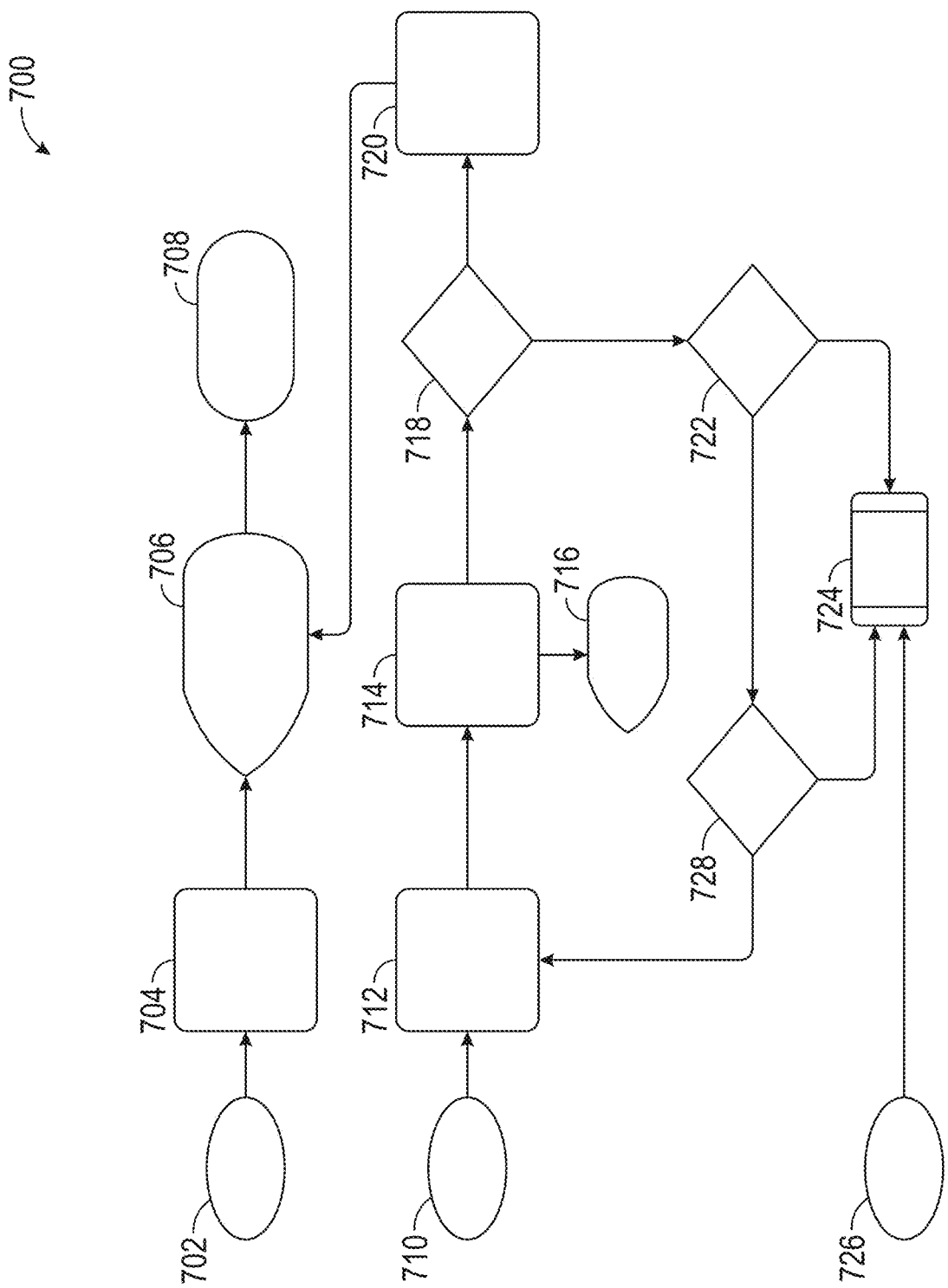
FIG. 7 depicts a diagram of an illustrative embodiment of a process for reviewing outcomes.

Turning to FIG. 7 a detailed diagram of a process 700 in step 328 is illustrated. The process 700 begins at step 702 where the inferencestreams coming from POHS reviews do not suggest any changes to those inferencestreams. The process 700 can then continue to step 704 where flexible problem-solving inferencestreams are packaged and persisted. This is advantageous over the hard model boundaries-based packaging of current ML models. The POHS GUI from step 706 is used by step 704 to accomplish deployment and monitoring tasks. The process 700 then can end at step 708, where the deployment is successful. The process 700 can also begin at step 710 where POHS reviews indicate certain operational updates required in the deployment package. The process 700 can then continue to step 712 where flexible problem-solving inference streams are packaged and persisted, along with required operational updates, such as guardrails to minimize operational risks, etc. Then process 700 can continue to step 714, where the operational updated inferences are subjected to rehearsal scenarios (tests) and POHS review results are captured. POHS GUI from step 716 is used by step 714 to accomplish rehearsal tasks.

The process 700 then can continue to step 718 where the POHS review results are evaluated by subject matter experts and other stakeholders. If the POHS review results are acceptable, process 700 then can continue to step 720 where flexible problem-solving inference streams are packaged and persisted. The POHS GUI from step 706 is used by step 720 to accomplish deployment and monitor tasks. The process 700 then ends with step 708, where the deployment is successful. If the POHS review results from step 718 are not acceptable then the process 700 can continue with step 722, where the unacceptable review results are examined to discern if the risks/issues originated from the inferences that were specifically created to address gaps, in this case operational updates. If the review at step 722 suggested that the issues originated with new inferences/operational guardrails, the process 700 can then continue to reevaluating and refining inference gaps in step 724.

On the other hand, if the review at step 722 suggested that the issues did not originate from the new inferences/operational guardrails, then the process 700 can continue to step 728, where examination to compose additional/new operational controls will be made. Essentially this suggests that the initial operational updates were not adequate. If additional or new operational controls were to be determined, then the process 700 can continue to step 712, where, as previously described, flexible problem-solving inference streams are packaged and persisted, along with required operational updates. On the other hand, if additional or new operational controls cannot be determined, then the process 700 can continue to step 724. On rare occasions, process 700 can also begin at step 726, where POHS review can identify new issues with existing inferences, such as stemming from a new system and its associated data feeds or a process. In that case step 726 will use the POHS metadata in identifying dependent stakeholders. In this flow, process 700 can transform to step 724 to revise the course of action.

Figure 8:
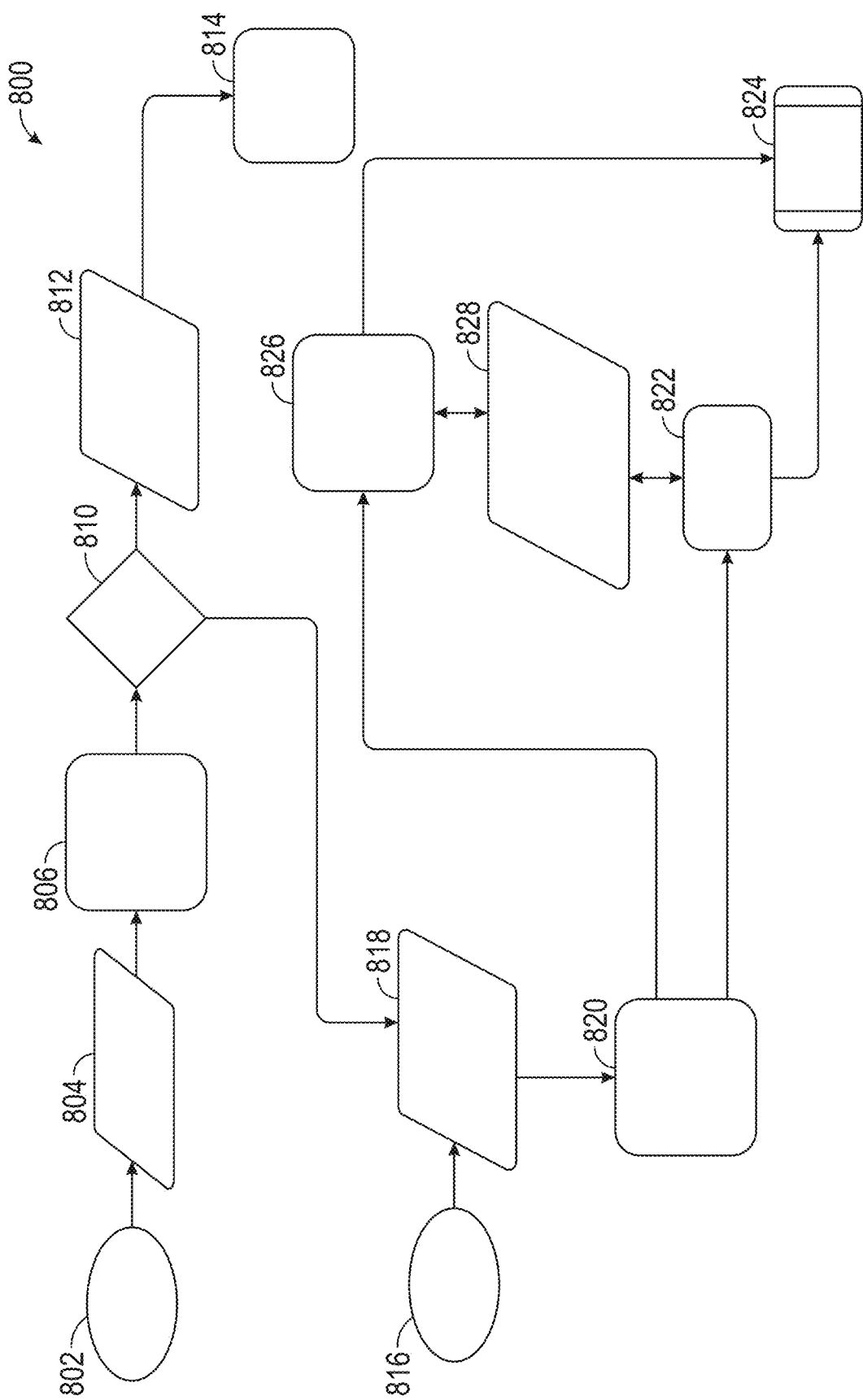
FIG. 8 depicts a diagram of an illustrative embodiment of a process for identifying inferencestream gaps.

Turning to FIG. 8, a detailed diagram of a process 800 in step 314 is illustrated. The process 800 begins at step 802 where inferencestreams that partially support the hypotheses are compiled. The partially supporting inferencestreams can have several conditions, where only some input data attributes are handled and/or only some hypotheses outcomes are addressed, and inferencestreams that can produce only some identified inputs of the current hypotheses. The process can then continue to step 804 where the partially supporting inference streams are organized and persisted into groups for threshold computations to support current hypothesis. The process 800 can then continue to step 806, where existing inferencestreams that produce inputs for current hypotheses in consideration are examined to determine trigger conditions, dependent inferencestreams that incorporate operational or other guard rails, and POHS metadata from their prior/other operational use. The process 800 then can continue to step 810, where the acceptance measures are reviewed and evaluated. If the acceptance measures are above the required thresholds for the current hypotheses in consideration (difference hypotheses can have different acceptance thresholds), then the process 800 can continue to the step 812, where they will be categorized and persisted as candidates to partially fulfill the current hypotheses.

Then the process 800 can continue to step 814, where the components of inferences and inferencestreams are composed into new inferencestreams that will be triggered appropriately with necessary operational and other guardrails. If the acceptance measures derived at step 810 are not sufficient then the process 800 can take an alternate at step 818. In addition, the process can also begin with the step 816, where there are no viable support from existing inferences to meet the current hypotheses outcomes. The process 800 can then continue to step 818, where all targeted inputs to the current hypotheses are compiled along with trigger conditions and guardrails. The process 800 then can continue to step 820, where traditional exploratory data analysis (EDA) are performed and tasks to identify, create and extract features (Feature Engineering) are completed. The process 800 can then continue to step 822, where the hypotheses inputs that were clarified by EDA and FE are examined to select appropriate ML algorithms that can be used on the input training data.

The process 800 can then continue to the step 824, where the following gaps are finalized utilizing the step 828: ML algorithms to use, input training data sets, POHS measures for data alterations are compiled. Simultaneously the process can continue from step 820 to step 826, where the training data and FE outcomes are used to identify other prior knowledge, new compliance and operational guardrails to be used with novel ML algorithms are compiled utilizing the step 828 to persist as gaps to be addressed. The process 800 can then continue to step 824 where the prior knowledge, new compliance and operational guardrails are added to the ML algorithm along with input training data information.

Figure 9:
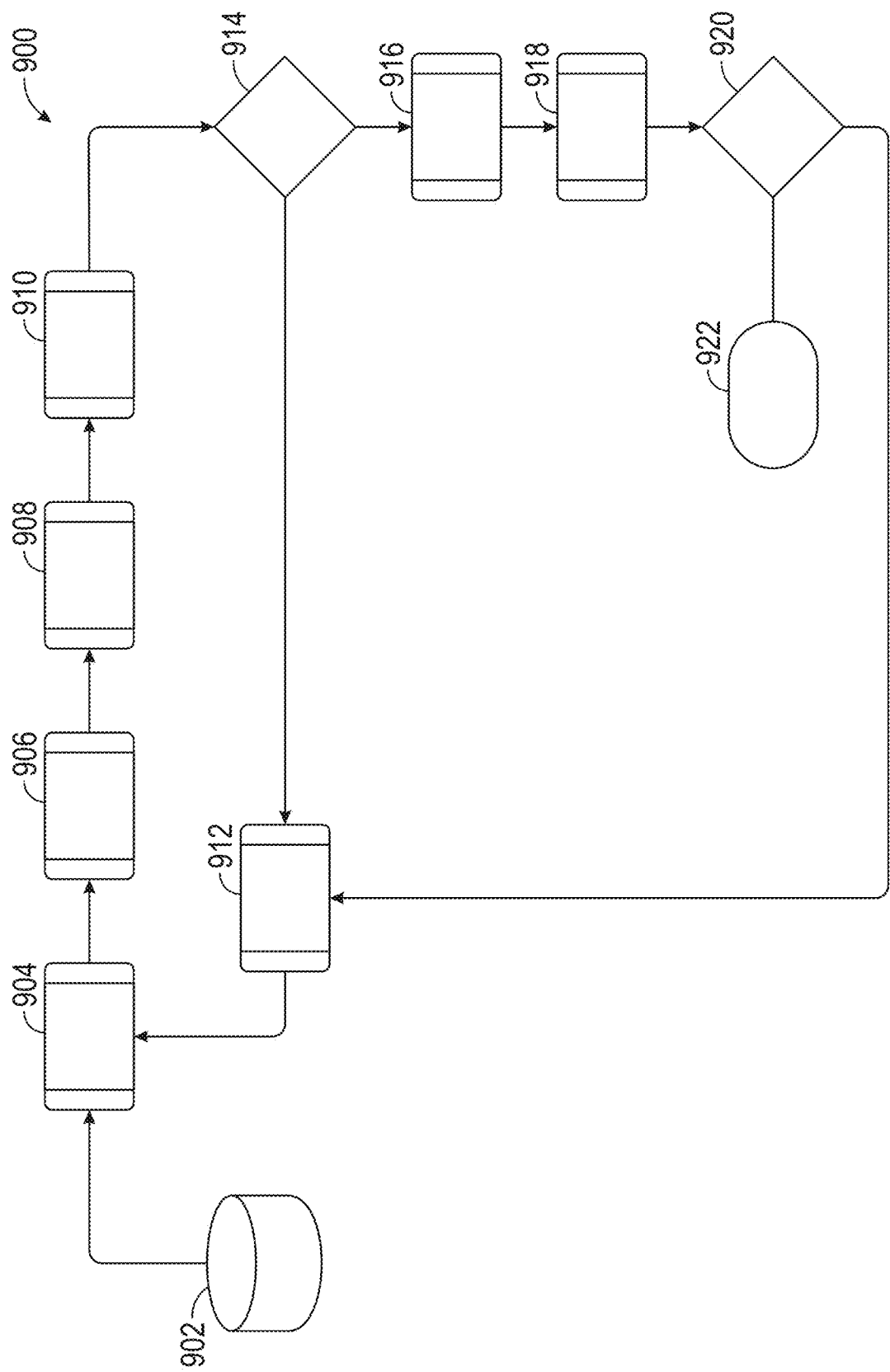
FIG. 9 depicts a diagram of an illustrative embodiment of a process for creating additional machine learning models.

Turning to FIG. 9, a detailed diagram of a process 900 in step 318 is illustrated. The process 900 begins at step 902 where the input training datasets are managed externally. The process 900 can then continue to step 904 where ML algorithms and input training data are examined to establish comprehensive conditions prior to training. The process 900 can then continue to step 906 where the training data is accurately organized/transformed to be consumed by the novel ML algorithm interfaces, such as data formats, data encodings, etc. Then process 900 can continue to step 908, where the novel ML algorithms are executed using the input training datasets. The ML algorithms produce a set of outputs and the process 900 can then continue to step 910, where the outputs are reviewed. The ML algorithm outputs are comprised of inference methods, POHS dimensions for data concepts and hypotheses characteristics and specific list of input attributes that are needed from the input training dataset to evaluate the inference methods. Then process 900 can continue to step 914, where an evaluation of the ML algorithm outputs is used to determine if they satisfactorily address the hypotheses outcomes and in compliance with required guardrails. If the evaluation is satisfactory, process 914 can then continue to step 916, where preparation for evaluation of the inference methods in addressing business conditions based on the hypotheses is carried out. This preparation includes based on the transparent inferences to obtain only the input attributes that are essential for the inference methods to make conclusions. In addition, if any transformation of these attributes were incorporated prior to model training, they are also incorporated in this preparation. Then process 900 can continue to step 918, where all rehearsal inputs are used in executing the new inferences created and validate the veracity of the current hypotheses. The outcomes are compiled. The process 900 can then continue to step 920, where the effectivity of the inferences in meeting the hypotheses are examined and if they are acceptable, the process 900 ends in step 922, where the model created is managed as needed. If the outcomes from the step 920 are not satisfactory, then the process 900 can continue to step 912, where all aspects of model training are examined as follows: Based on the review outcomes from the step 920, if additional input data are needed for training they are added as newly found gaps. In addition, if the ML algorithms used did not support the hypotheses outcomes, alternative ML algorithms are considered in this step. The process 900, can also continue based on the outcome from the step 914, where the inference steps are determined to be lacking even without the rehearsals to step 912. Once the remaining gaps are identified in step 912, the process can continue back to step 904.

Examples of Generating Inference Methods

Figure 10:
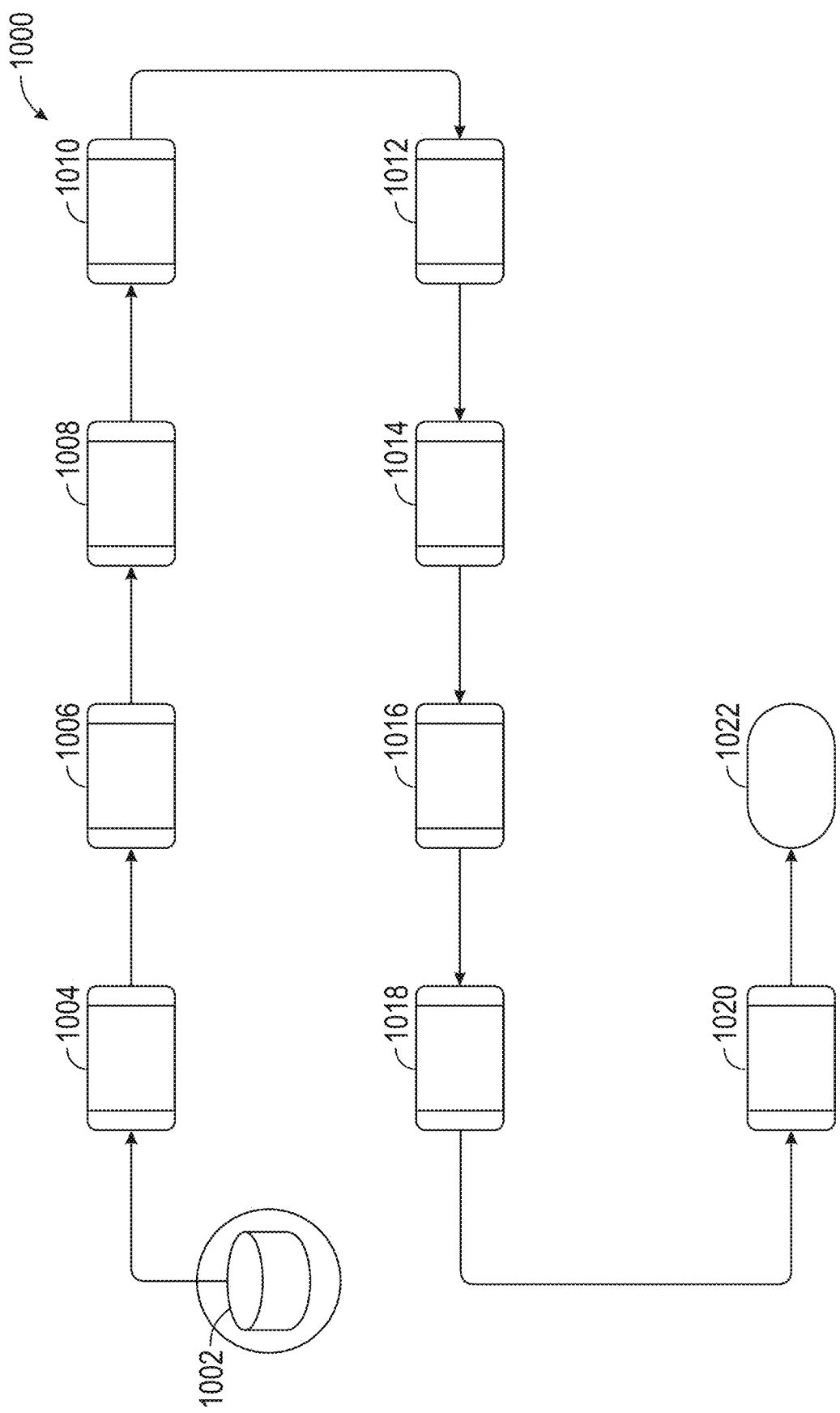
FIG. 10 depicts a diagram of an illustrative embodiment of a process for generating inference methods.

With reference to FIG. 10 a detailed diagram of a process 1000 that depicts how ML algorithms can derive inference methods and associated POHS dimensions in step 908 is illustrated. The process 1000 begins at step 1002 where all training data and features needed are organized or consumed from external data sources. The process 1000 then can continue to step 1004, where all training data are extracted by using the data attributes selected from user prompts and obey selection criteria provided, into internal data structures as needed by the ML algorithms. Then the process 1000 can continue to step 1006, where data pattern identification procedures are applied on various combinations of input data that result in desired outcome data attribute values. These are called as correlation sets. Once the correlation sets are obtained, contribution measure of each attribute in the correlation set are established. In addition, the specific identification (or selection) procedure applied in forming the correlation set attributes is associated with each input attribute in the correlation set. Thus, this procedure establishes how and why each input data attribute contributes to the correlation set.

The process 1000 then can continue to step 1008, where the correlation sets are ordered by a composite pattern identification measure to be used in eventual POHS analysis. Then the process 1000 can continue to step 1010, where correlation sets are selected based on configurable thresholds. Essentially all correlation sets that are above the configurable thresholds are candidates for eventual inference methods. Then the process 1000, can continue to step 1012, where computation procedures are applied to determine permutations of correlation sets that collectively result in occurrences of output data attribute values. Multiple computation procedures are applied to determine the optimal permutations and each resulting permutation of the data attributes correlation set is assigned the computation procedure used and the resultant correlation score of the permutation. The process 1000 then can continue to step 1014, where a composite set of information is associated with the permutations as follows. Each input attribute correlation computation/identification procedure, correlation score, permutation computation procedures and permutation correlation score, and relative importance of each training attribute as established by the ML algorithms based on POHS KB data. Each ML algorithm can apply algorithm specific permutation resultant computation and assign to the permutation correlation sets.

At this stage the focus will be on a collection of input data attributes contained in the permutation correlation set. Then the process 1000 can continue to 1016, where permutation correlation sets that are above a set of composite threshold values are selected. Then the process 1000 can continue to step 1018, where inference methods are generated as follows. Only permutation correlation sets that have higher than required thresholds are used in generating inference methods. Entire permutation correlation set maps to an inference method. Each input attribute in the permutation correlation set along with the value selection criteria of the correlation are used to create an inference step. Thus, an inference method can comprise of multiple inference steps, providing an accurate mapping of the permutation correlation set to an inference method. So when the inference method is applied to operational inputs, they can use the correlation knowledge to predict outcomes and associate POHS metadata. Then the process 1000 can continue to step 1020, where inference methods are used to create implementation procedures that will be used to deliver the following functionality. Knowledge bases are created using the inference steps and methods with necessary preconditions and action steps that can result from the preconditions. Inference methods knowledge will also contain software routines to capture metadata to help analyze how the inference methods are computed. In addition logic formulae representation of the inference methods are created using preconditions, actions, and scope quantifiers. Then the process 1000 can continue to 1022 where the training tasks are properly completed with persisting the outcomes.

The following series of tables provide examples of various stages of how inference methods are formed as depicted in the process 1000 illustrated in FIG. 10. For this example, the ML algorithm is provided with 7 data elements, consisting of 6 Data Attributes that function as independent input measures for training and an Outcome that is dependent on these data attributes, as shown below in Table 1.

TABLE 1

| Data Elements | Role |
|---|---|
| Data Att1 | Independent Variable |
| Data Att2 | |
| Data Att3 | |
| Data Att4 | |
| Data Att5 | |
| Data Att6 | |
| Outcome | Dependent Variable |

As seen in Table 2, algorithms use the data elements and compute the following information and apply the threshold criteria that is provided. The pattern identification procedures can vary among ML algorithms and indicate what computation is involved in identifying patterns in the input data. Examples include complete match of values, subset matches or values, result from applying some complex functions like entropy measures, etc. The pattern selection/match results in score that indicates the level of relevance of both the data and the function applied in the pattern match process. The set of data for each data attribute is called a correlation set. The values of each data attribute that are in the correlation set map to values of the outcome.

TABLE 2

| Data Attributes | Pattern ID Procedure (1 of n) | Pattern ID Procedure Score | Outcome (1 of n) | Above computed/ provided threshold |
|---|---|---|---|---|
| Data Att1 | Pattern ID Procedure (1 of n) | Pattern ID Procedure Score1 | Outcome (1 of n) | Y |
| Data Att2 | Pattern ID Procedure (1 of n) | Pattern ID Procedure Score2 | Outcome (1 of n) | Y |
| Data Att3 | Pattern ID Procedure (1 of n) | Pattern ID Procedure Score3 | Outcome (1of n) | N |
| Data Att4 | Pattern ID Procedure (1 of n) | Pattern ID Procedure Score4 | Outcome (1 of n) | Y |
| Data Att5 | Pattern ID Procedure (1 of n) | Pattern ID Procedure Score5 | Outcome (1 of n) | N |
| Data Att6 | Pattern ID Procedure (1 of n) | Pattern ID Procedure Score6 | Outcome (1 of n) | N |

After the correlation sets are determined, threshold criteria is applied to select attributes that exhibit strong correlation. Any criteria that can be used in determining the threshold will also be associated as POHS metadata. As seen in Table 3, from the six attributes, only three support the outcomes based on thresholds. Only the threshold computation decisions are shown as threshold computation can vary.

TABLE 3

| High Threshold Data Attributes | Pattern ID Procedure (1 of n) | Pattern ID Procedure Score | Outcome (1 of n) | Above computed/ provided threshold |
|---|---|---|---|---|
| Data Att1 | Pattern ID Procedure (1 of n) | Pattern ID Procedure Score1 | Outcome (1 of n) | Y |
| Data Att2 | Pattern ID Procedure (1 of n) | Pattern ID Procedure Score2 | Outcome (1 of n) | Y |
| Data Att4 | Pattern ID Procedure (1 of n) | Pattern ID Procedure Score4 | Outcome (1 of n) | Y |

Once the high threshold data attributes are available, permutations among them are examined and permutation resultant computation is applied to get a composite score. The permutation correlation identifies interplay of the individual attributes in correlating to the outcome, which is indicative of inference methods applicability in predicting the outcome. With the permutation composite scores available, each ML algorithm will apply inference methods selection criteria to assign the permutation a relevance value as shown below. For example, as seen in Table 4, formation of inference methods will consider techniques like "traditional or modern square of opposition" to classify contradictory and logically undetermined nature of inferences. Some permutation resultant computation is not associative and so the order of resultant computation matters (e.g., subtraction, exponentiation) and will result in different composite scores.

TABLE 4

| High Threshold Data Attributes | Permutation Resultant Computation Procedure (1 of n) | Permutation Resultant Computation Procedure Score | Outcome (1 of n) All Associated Data Attributes Combined Produce the Outcome | Above computed or provided threshold | Select For Inference by ML Algorithm |
|---|---|---|---|---|---|
| Data Att1, Data Att2, Data Att4 | Permutation Resultant Computation Procedure (1 of n) | Permutation Resultant Computation Procedure Score1 | Outcome (1 of n) | Y | N |
| Data Att1, Data Att2 | Permutation Resultant Computation Procedure (1 of n) | Permutation Resultant Computation Procedure Score2 | Outcome (1 of n) | N | N |
| Data Att2, Data Att4 | Permutation Resultant Computation Procedure (1 of n) | Permutation Resultant Computation Procedure Score3 | Outcome (1 of n) | Y | Y |
| *** (all permutations) | Permutation Resultant Computation Procedure (1 of n) | Permutation Resultant Computation Procedure Score4 | Outcome (1 of n) | N | N |
| Data Att4, Data Att2, Data Att1 | Permutation Resultant Computation Procedure (1 of n) | Permutation Resultant Computation Procedure Score3 | Outcome (1 of n) | Y | Y |

Turning to FIG. 11, a table of inferencestream permutations is depicted. Only two permutations qualify in this example (see column 1, rows 2 and 3), and they are provided as inference steps and methods along with values that will be used to place them along POHS dimensions (e.g., FIG. 2).

In another embodiment, an example of a transparent algorithmic decision for predicting a risk level is provided. The algorithmic decision is derived from the ML algorithm using various training data attributes. Non-limiting examples of training data attributes include: object type, transX, transY, rotsX, rotsY, rotsZ, states, occl, occlKF, trunc, amtOccl, amtOcclKF, alt, roll, pitch, yaw, vn, ve, vf, vu, ax, ay, az, af, al, au, wx, wy, wz, wf, wl, wu, speed, direction, angular difference, distance, speed, and acceleration. In this example, of the various training data attributes, the ML algorithm identified a set of training data along with evaluation criteria that generated a high-level risk correlation. Multiple correlations result in multiple inferences. An example of the algorithmic decision for the instant example is shown below in Table 5.

TABLE 5

| Factor | Value |
|---|---|
| Distance | 3.4-7.9 |
| Object Type | Pedestrian |
| Movement Direction | 72.1-143.9 |
| Velocity—North | −3.38-1.9 |
| Velocity—East | −6.95 and −2.26 |
| RAI_COMP_V1 (compliance management criteria) | Rehearsal Verified |

The table illustrates an inference method, which are composed from the basic building block called inference steps (e.g., Velocity-East). For example, Table 5 may relate to a model that predicts risks to a security patrol team in a hostile environment from various actors. The patrol team uses vehicles during their operations and various sensors are mounted on the vehicle to capture environment conditions. The sensors can include video, lidar, and inertial measurement units that capture sensor data. The sensor data is captured and transformed into the data attributes listed. The sensor data are then associated with threats from observed and confirmed events. Then the ML algorithms use such historical sensor data and threat assessments to create a set of inference methods that can predict risks so that the patrol team can take necessary precautions. For example, in Table 5, an inference method suggests a risk level when the petrol team encounters a Pedestrian when they are at a Distance and when the patrol vehicle is maneuvering at characteristics indicated by the inertial measurement unit measurements, such as velocity.

Inference steps essentially define what factor must be examined or evaluated and what value (or range) the evaluation should correspond to. If the factor is evaluated to match its corresponding value, then the inference step is valid in part to make the conclusion. When all inference steps included in the inference method are evaluated, then the inference method is able to make a conclusion. In some examples, partial evaluation of an inference method does not result in a conclusion, unless an operational override is issued.

Inference methods can further be composed into inferencestreams. Inference methods can either be generated from ML algorithms or created from domain knowledge. The inference methods can be standalone entities. Multiple inference methods can be composed into an inferencestream as shown. The composition can be accomplished through operational events and/or purposeful dependencies. Moreover, an inferencesteam can also be composed from multiple inferencestreams. In addition, an inferencestream can be composed from an inferncestream and inference methods.

POHS Review Scenarios

The visualizations generated by the disclosed processes (e.g., FIG. 2) produce an advantage of bringing together various stakeholders to examine algorithmic decision steps, irrespective of the ML algorithms or functional domains used. The advantage is a result of how the ML algorithms use the same knowledge base definitions. Therefore, stakeholders are able to not only examine specific inference method, but also the interplay with the inferences via a framework. The visualization 200 can be used to examine the algorithmic decisions in multiple ways and so can be depicted through multiple charts that may not necessarily follow a particular sequence, although each chart follows a defined sequence, based on the scenario.

Figure 12:
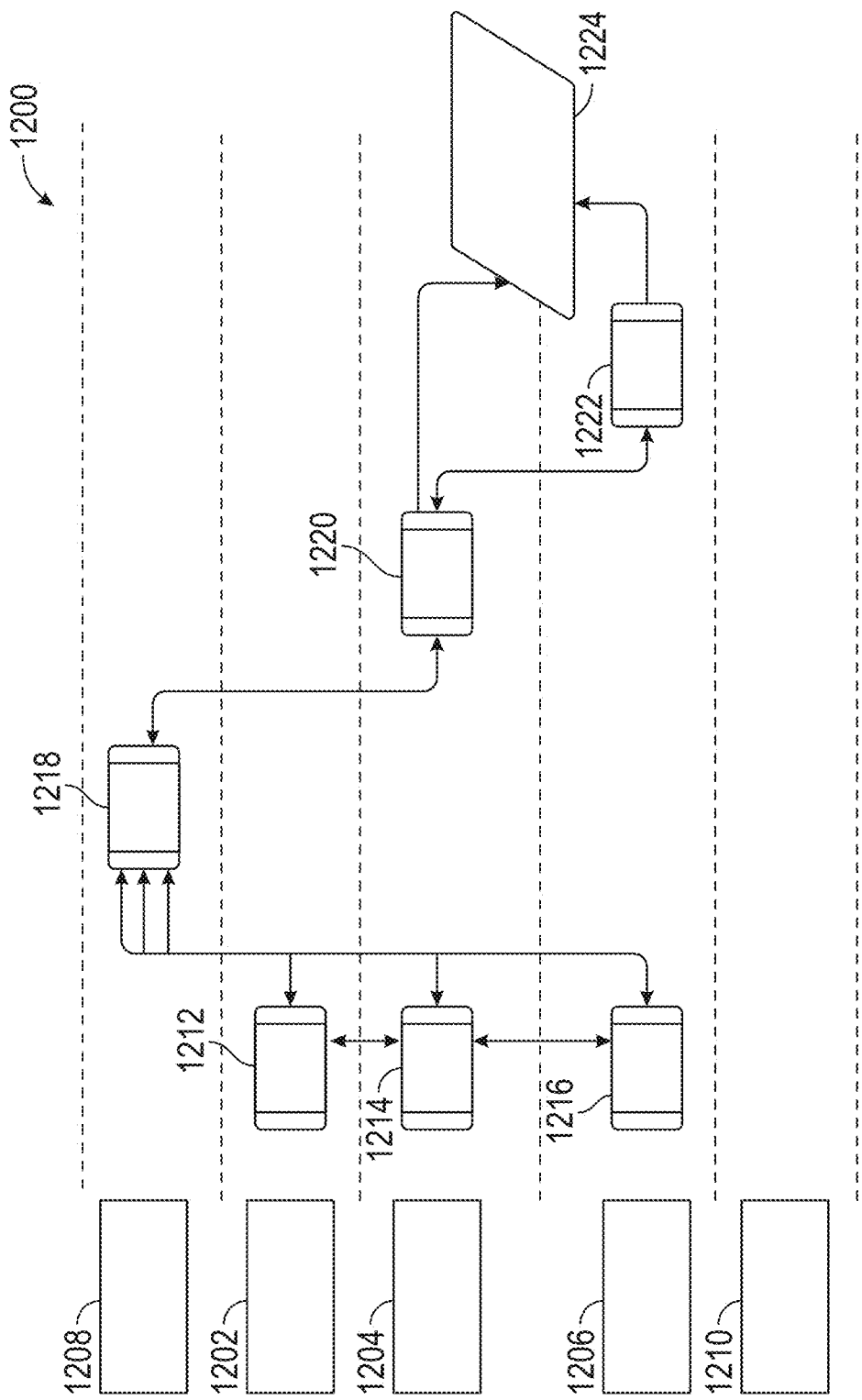
FIG. 12 depicts a diagram of an illustrative embodiment of a process for reviewing scenarios.

With reference to FIG. 12, a detailed diagram of swim lanes-based scenario review is illustrated in process 1200 depicting an embodiment of a first user, a Data Scientist 1202 sharing model training and algorithmic decisions with other users who bring their respective domain knowledge to the conversations. Such a review process is advantageous where an inference method can be examined from multiple perspectives thereby minimizing risks in adoption. The scenario review depicted in FIG. 12 uses the information shown in FIG. 2. Each process in the swim lane diagram is associated with the stakeholder identified and detailed to illustrate the review process.

Data Scientist 1202 begins the process from step 1212 and informs that there are two inference methods included in the POHS of FIG. 2, as indicated by lines 210 and 212. Each one of lines 210 and 212 connects all the inference steps that will be evaluated to make respective decisions related to the hypotheses. Data Scientist 1202 typically generates such inference methods using the processes illustrated in FIGS. 9 and 10.

Upon reviewing the POHS metadata that includes data attribute information, the data custodian 1204, using step 1214 examines from their domain expertise that the data sources that provided data for the models to compose the inference methods did not have known issues. While Data Scientists 1202 can know this information due to their robust processes, Data Custodian 1204 can be exposed to the knowledge related to the use of the data asset, their engagement provides sufficient coverage. This is advantageous in comparison to ML models that operate in a black box manner. Data Custodians 1204 can use the POHS dimensions related to Data Alterations and Data Concepts to provide more authoritative confirmation on the valid uses of the underlying data or address deficiencies. They can bring out issues such as bias present in that data and suggest proper handlining.

Operation Stakeholder 1206, can then provide their perspective of the inference methods at step 1216, where they can test (or rehearse) the inference methods in the context of relevant operational processes/agents can be completed identifying, for example, four low risk issues. Risks are examined in the context of POHS dimensions (or viewpoints). For example, an examination of one of the low-risk issues can indicate that the bias present in the underlying data can contribute to that risk. In such a scenario, Data Custodian 1204 and Data Scientists 1202 can provide mitigation strategies from what they can address, such as data transformations that normalize the biased data and apply retraining or include a domain bias management inference step within the inference methods itself.

The Business Stakeholder 1208 can continue the process 1200 with step 1218, using the information provided from steps 1212, 1214 and 1216 to evaluate and can conclude that the low-risk issues are acceptable. Recognizing that the inference step that suggests the evaluation of Distance attribute 208 are shared among both the inference methods (210, 212), this indicates the shared scope of the distance attribute's influence. Although FIG. 2 depicts two inference method lines distinctly, the visualization may be configured to depict one of the lines as a dashed line. Both inference methods align on the three dimensions in how the algorithmic decision step related to Distance is made. Based on the scope of its use, Business Stakeholder 1208 can suggest additional POHS metadata that can be captured to monitor the use of Distance attributes (like contexts, values, time series change, etc.). It is advantageous for Business Stakeholder 1208 to understand how the factors that they handle in business operation/decision play a role in algorithmic decision processes by using the POHS visual framework. Moreover, they also recognize that multiple stakeholders have contributed to the veracity of the inference method. This provides an advantage to the enterprise where issues that originate from unaccounted factors can bring the stakeholders together to collectively examine and establish additional discoveries. Some discoveries can also lead to hypothesis formation that can follow the POHS framework described herein.

To illustrate the comprehensive nature of the dialog that the process 1200 can support, a scenario is included where the Data Custodian 1204 can bring out historical knowledge in step 1220. For example, based on prior reviews, comprehensive monitors have been in place to measure the accuracy and deviation metrics associated with the Distance attribute 208, suggesting the awareness of the technology stakeholders of the importance of a factor to Business. POHS framework through its metadata can provide to the Business Stakeholder 1208, the lineage of the prior reviews. The Data Custodian can include the accuracy report for subsequent reviews for ongoing monitoring by Business Stakeholder 1208.

The process can continue with Operations Stakeholder 1206 to step 1222, where sensors that are involved in capturing and using Distance attribute measures will be placed in observation. Moreover, they can include end users in the observation loop as well. All updates from such conversations can augment metadata in step 1224, completing process 1200.

Figure 13:
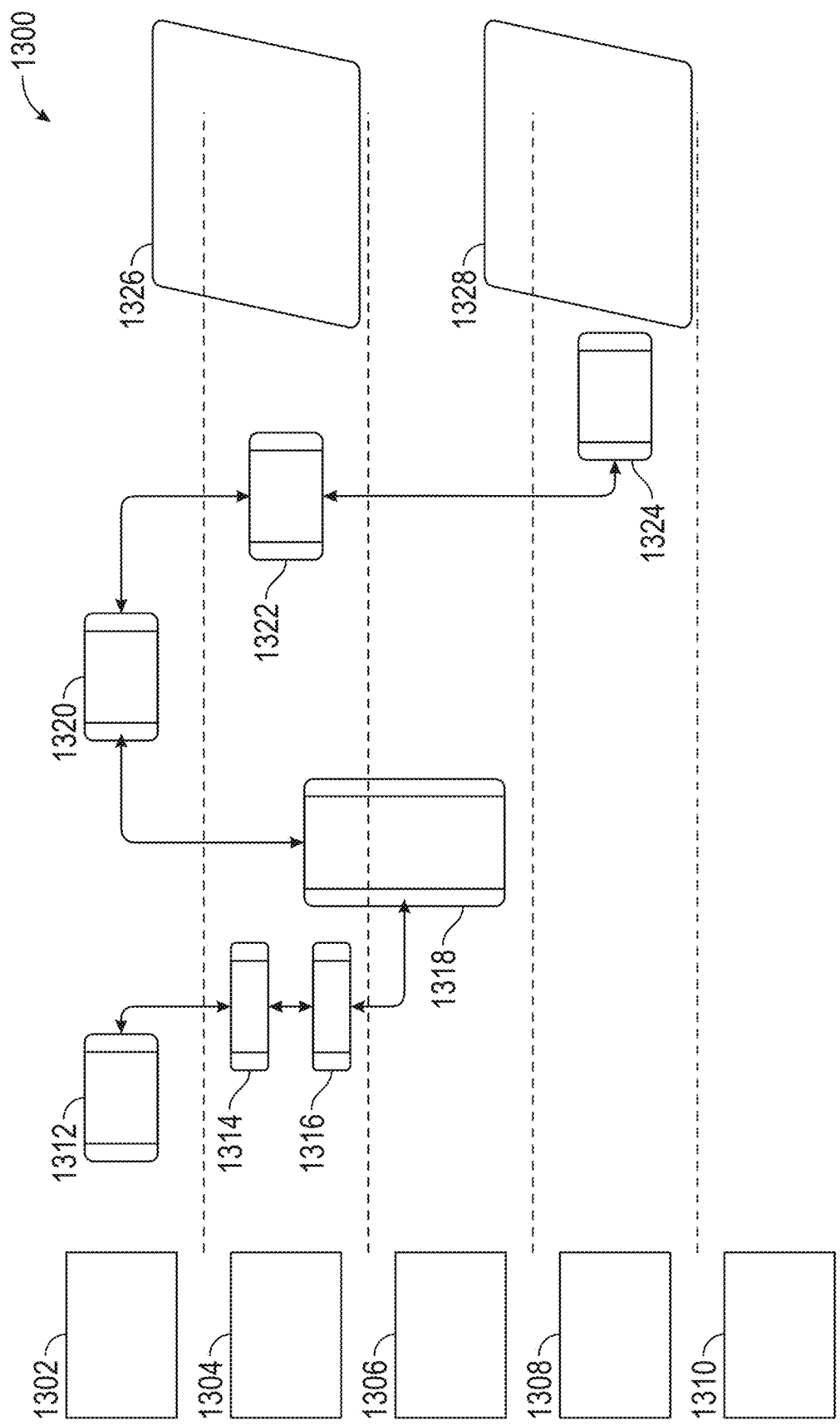
FIG. 13 depicts a diagram of an illustrative embodiment of another process for reviewing scenarios.

With respect to FIG. 13, a detailed diagram of swim lanes-based scenario review is illustrated in 1300, depicting an embodiment of a Business Stakeholder 1302 sharing a concern based on algorithmic decisions, with one plausible explanation being provided in response. The scenario depicted in FIG. 13 is a continuation of conversations from the scenario depicted in FIG. 12.

The Business Stakeholder 1302 initiates the scenario at step 1312, with the observation that the relative role/importance of the inference step affect both inference methods 210 and 212 and are inconsistent with each other. Two instances of the Direction decision inference step are placed on different slots on the dimensions. The Business Stakeholder 1302 can examine risks that this inconsistency can create Data Scientist 1304 then participates in the process 1300, and can move to step 1314 and 1316 simultaneously where the Data Scientist 1304 outlines that the two inference methods are in fact generated by two different functional units. Although both teams used the same ML algorithm, the data sources that provided the training data were not the same. This is a common occurrence where different functional data marts can be built by different teams to suit their functional needs such as focused requirements, function driven availability constraints, etc. Thus, it is advantageous to have a POHS framework to enable consistent review. The Data Scientist 1304 uses both steps to compile distinct information from two functional models.

The process 1300 then can continue with Data Custodian 1306 to step 1318, where it can be confirmed that the two data sources do not have any known data issues. On the other hand, Data Custodian 1306 can confirm that one of the databases filters out data from one of the geolocations due to its irrelevance to that functional unit that the data mart was built for. Such specializations are common among businesses that are organized functionally as separate organizational units to accommodate practical needs, such as minimizing costs from data storage and additional processing, compliance requirements that may limit a functional unit from accessing filtered data, or improved stability from using only data that is needed to support the functional units. It is advantageous in each of the above listed example scenarios to enable a dialog among stakeholders in organizing remediation. For an example, if a functional unit is not authorized to access a specific section of the data, then stakeholders can extend the limiting authorization to ML models also using the POHS framework. However, to benefit the teams or functionalities that have authorization, the stakeholders can recommend the transfer of ownership of building the models to teams that have the necessary authorization.

With the knowledge gained from Data Custodian, the process 1200 can continue to Data Scientist 1304 at step 1318, where it can be confirmed that the data concept that the ML algorithm used, information gain measure, was different as the training data distribution is not the same and so the inference step is placed on different data concepts value, thereby validating the data driven behavior, rather than software issues.

The process 1300 can continue with Business Stakeholder 1302 at step 1320, where it can be recommended that the use of the inference method for field operations in geographic locations of filtered data is not approved, although other locations can use the inference methods. Further the Business Stakeholder 1302 can direct that pending further analyses for locations with data that is filtered out and use of the direction attribute value from unfiltered locations in further refined rehearsals (not operational use) and review the results to make sure that filtered location cannot use the inference method while other locations can. POHS framework is advantageous to examine inference methods in transparent manner.

The process 1300 can continue with Data Scientist 1304 at step 1322 updating the corresponding inference method with appropriate metadata of the compliant use and begin with revised rehearsals. Thus, the POHS framework is advantageous where data scientists are able to collaborate to obtain compliant results.

The process 1300 can continue with Operations Stakeholder 1308 at step 1324 where the scope of impact analysis using POHS metadata for uses of Direction data attribute in other inference methods can be expanded. This is advantageous in situations like evolving fairness or compliance considerations, where prior noncompliance can be re-assessed.

Figure 14:
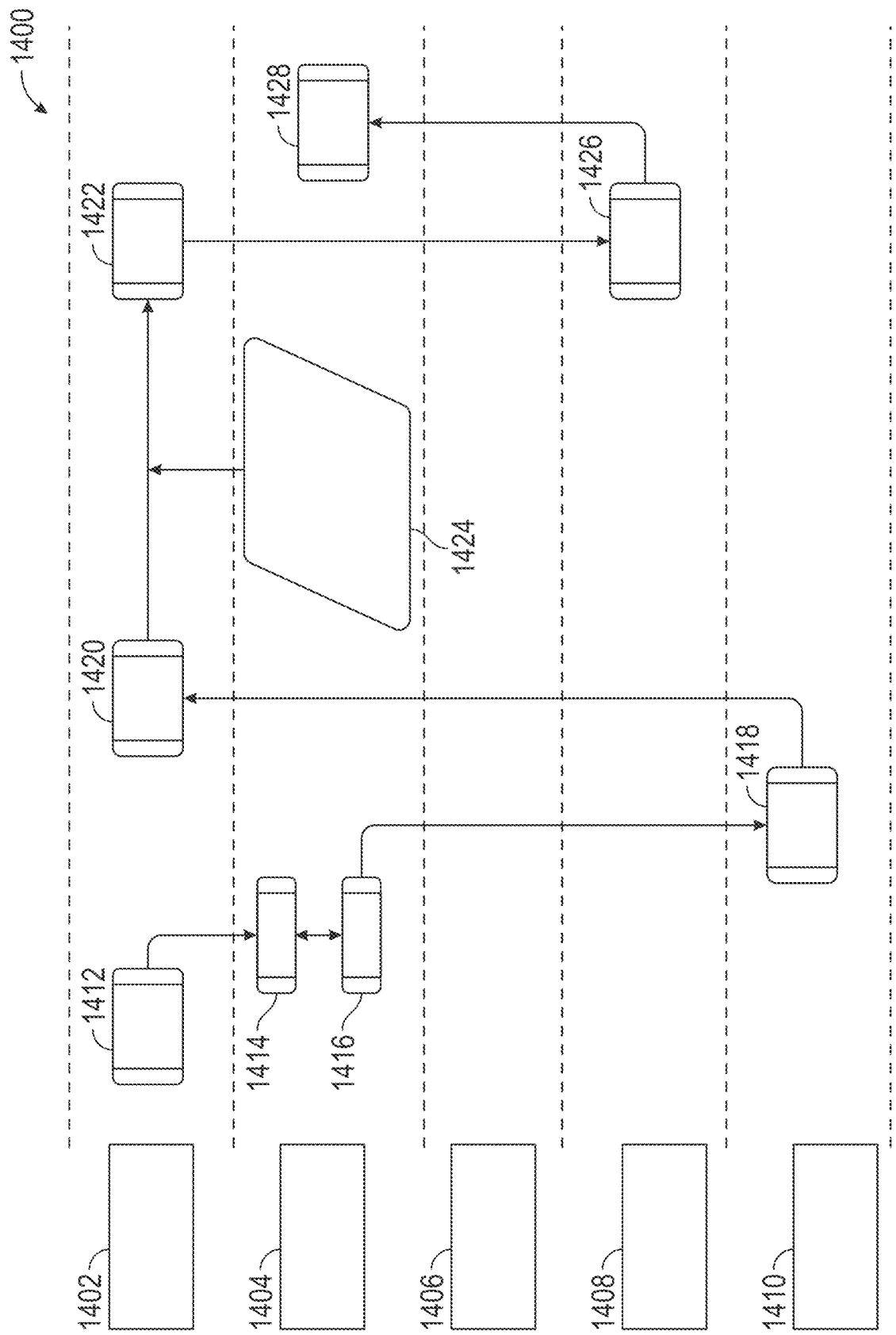
FIG. 14 depicts a diagram of an illustrative embodiment of another process for reviewing scenarios.

With respect to FIG. 14, the process 1400 provides an alternative assessment, where Business Stakeholders share a concern based on algorithmic decisions as depicted in the scenario of FIG. 13, but with another plausible explanation can be provided. Here, instead of two different functional units involved, one functional unit is utilized with two different ML algorithms on the training dataset-often called multi-strategy or ensemble learning.

Process 1400 begins with Business Stakeholder 1402 at step 1412 initiating the observation that the relative role/importance the inference step-direction attribute-affects both inference methods 210 and 212, which are inconsistent with each other. Two instances of the decision step are placed along different slots on the dimensions. The Business Stakeholder 1402 can seek any risks that this inconsistency can create.

Data Scientist 1404 can continue the process 1400 at steps 1414 and 1416, where they outline that the two inference methods are in fact generated by two different ML algorithms, as part of ensemble learning approach. Both algorithms used different pattern recognition computation and so the relative scores difference indicates how the inference step is differentiated by two ML algorithms.

The process 1400 can then continue with ML Algorithm Engineer 1410 at step 1418, where it can be explained that the Data Concepts used by the ML algorithms indicate the value of using both inference methods 210 and 212 lines and provides broader coverage through ensemble learning approach. Thus, the ML Algorithm Engineer 1410 provides an informed support to what the Data Scientist 1404 has set out to accomplish, providing a comprehensive treatment to the decision making. The ML Algorithm Engineer 1410 can identify that the first model that used the decision tree algorithm produced the first set of parameters for the Direction attribute using the information gain value. The second model that used the neural networks produced the second set of parameters for the Direction attribute using the tanh activation function value. An example application of neural networks (or neural networks algorithm) can include using tanh activation function measurements. Therefore, both models can be considered for further testing using software agents.

The process 1400 can then continue to Business Stakeholder 1402 at step 1420 where compilation of testing involving both inference methods is completed. Because different inference methods can be composed into a composite inferencestream to increase coverage scope, Business Stakeholder 1402 at step 1420 can complete valid combinations. The process 1400 can then continue to 1422, where a review of the testing indicates no significant issues when neural network driven inference is used as a precursor step to the decision tree driven inference—i.e., defining the structure or dependency mechanism to generate an inferencestream—to address broader situations, and create POHS metadata for further review.

The process 1400 can then continue to Operations Stakeholder 1408 at step 1426 where for the new inference stream (neural network driven inference is used as a precursor step to the decision tree driven inference), a compliance management criterion can be added to help operational interface integration, for example, through preestablished message format to facilitate added monitoring.

The process 1400 then can end by Data Scientist 1404 at step 1428, where a new inferencestream is created as suggested in steps 1420, 1422 and 1426.

Figure 15:
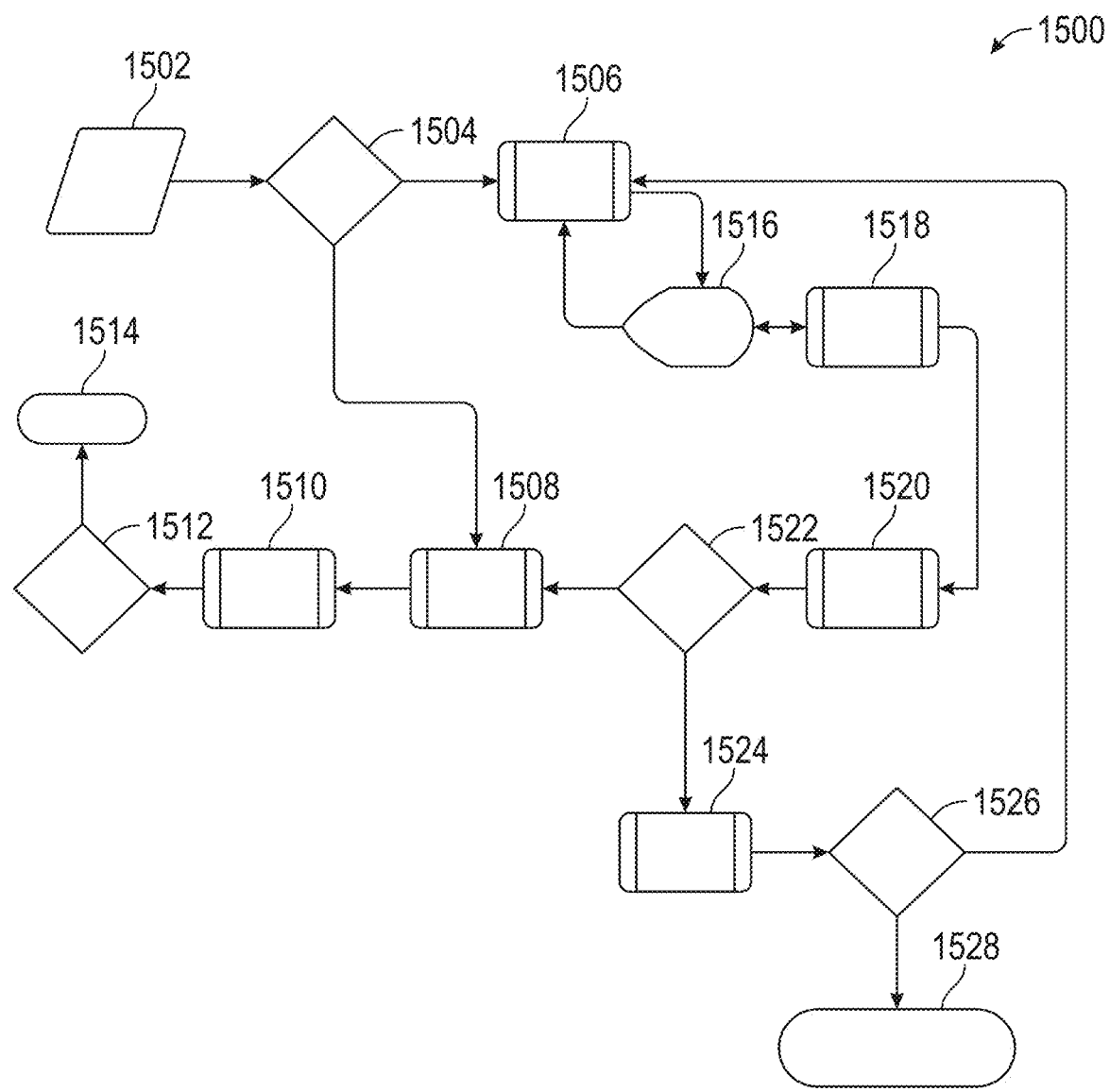
FIG. 15 depicts a diagram of an illustrative embodiment of a process for analyzing inferencestream gaps.

With respect to FIG. 15, the diagram illustrates the process 1500 where one or more POHS review gaps can become candidates to be addressed through domain knowledge, that may be from compliance, operational or business domain knowledge. The process 1500 begins at step 1502, where POHS reviews identify gaps in inference streams. The process can then continue to step 1504 where subject matter experts examine if domain knowledge exists in POHS KB and can be used to resolve the gaps. If no domain knowledge exists in POHS KB to address the gaps, the process 1500 can continue to step 1506 where business, technical and operations stakeholders incorporate or formulate necessary domain knowledge using inference method formats into the POHS KB. The stakeholders use the POHS GUI in step 1516 to accomplish the tasks at step 1506.

The process 1500 can then continue to step 1518, where newly incorporated POHS KB are translated into suitable logic formulae using the following at least one or more of the following logic: predicate, propositional, or Higher Order. Then process 1500 can continue to step 1520 where external theorem provers are utilized to validate that the newly added domain knowledge is consistent with existing knowledge. Then process 1500 can continue to step 1522, where POHS KB extension from the newly added knowledge is verified for consistency. If the POHS KB is consistent from the addition of new POHS knowledge, then process 1500 can continue to step 1508. Alternately at step 1504, if POHS KB contains domain knowledge that can be used to address the gaps identified at step 1502, then the process 1500 can continue to step 1508, where POHS KB is translated into an inference step, method, or stream depending on the gaps and the POHS KB components availability. Then process 1500 can continue to step 1510, where the new inference steps/methods/streams incorporated from existing domain knowledge can be verified using gap addressing testing.

Then the process 1500 can continue to step 1512, where the gap resolution testing results are examined and, when acceptable, the process 1500 can conclude at step 1514. Alternately at step 1522, if the extended POHS KB from the new POHS knowledge addition does not have consistent results, then process 1500 can continue to step 1524 where the inconsistencies are reviewed, and gap and conflict resolutions can be prioritized to be addressed. When the priorities are established, the process 1500 can continue to step 1506, where, as previously described, business, technical and operations stakeholders incorporate or formulate necessary domain knowledge using inference methods formats into the POHS KB. On the other hand if gap and conflict resolutions cannot be prioritized to be addressed, process 1500 can continue to step 1528, where unresolved gaps and potential resolutions are compiled for further POHS review for guidance, such as addressing data repositories, policy updates, budgets, etc.

Figure 16:
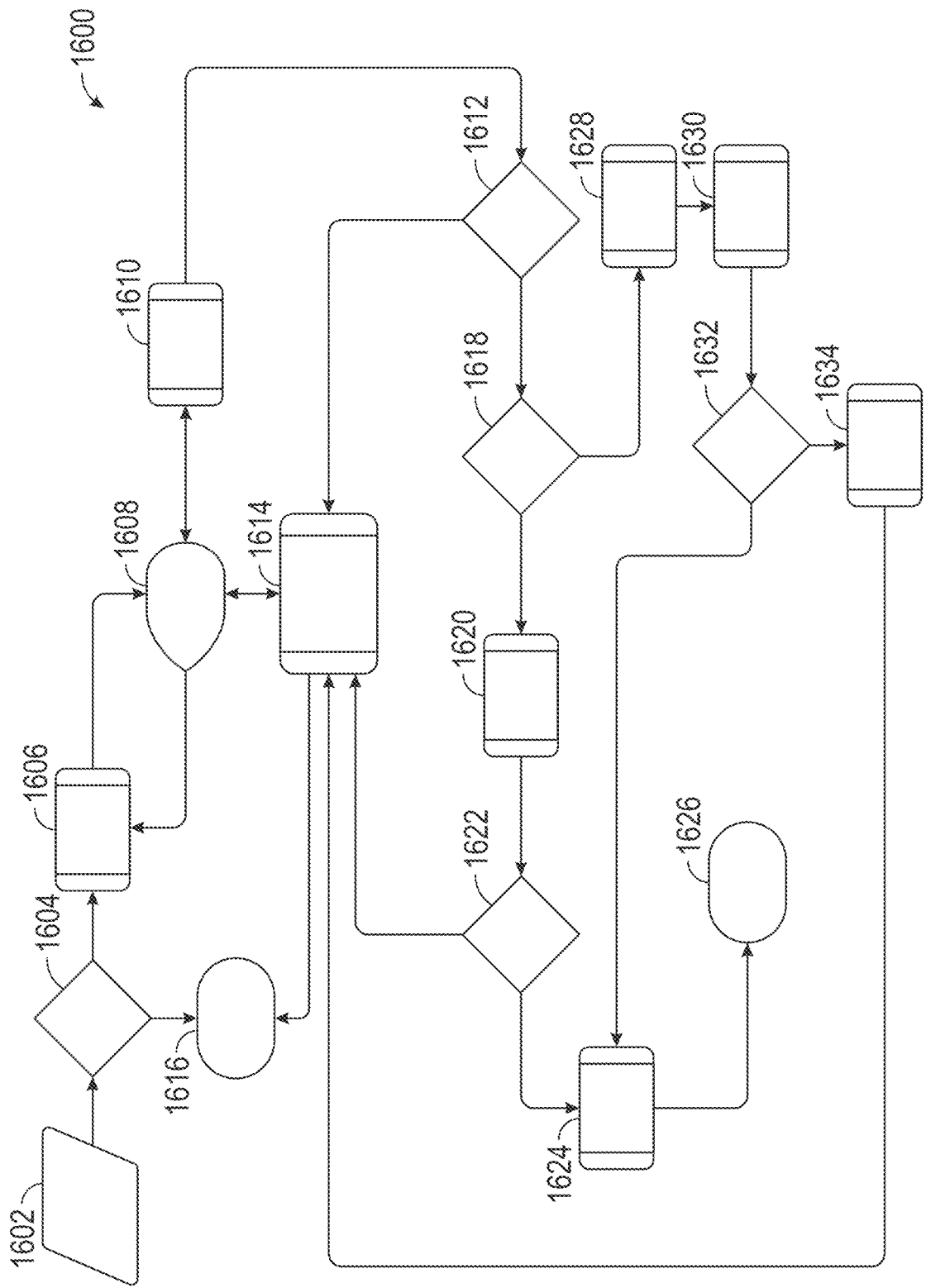
FIG. 16 depicts a diagram of an illustrative embodiment of a process for managing and organizing a knowledge base.

With respect to FIG. 16 the process flow 1600 can be used to describe POHS KB organization. POHS KB organization can be used to maintain performance, compliance (including data), and knowledge security. To manage a scalable POHS KB organization, the POHS KB can be organized into a central component that can be used by other components. Both central and independent components of POHS KB can support hierarchical relationships to scale out further. In one embodiment, the innate inference faculty of a central component can include common knowledge, world or domain level axioms, and/or knowledge that can form additional knowledge through logical deduction. ML generated knowledge can function as independent components and, in some situations, can be promoted to be treated as innate inference faculty to assist businesses to derive new knowledge.

The process of promoting ML generated knowledge 1600 begins with step 1602 where comprehensive POHS metadata associated with the inference methods are obtained. POHS review establishes criteria that can be used in the promotion process at step 1604. Criteria for innate inferences can be created from parameters such as the degree or measure of use of an inference in the same form (e.g., indicating a stable and central inference method), measure of occurrences of dependent inference methods triggered with or without explicit dependencies, measure of occurrence of other inferences that lead to the occurrence of the inference methods, and/or measure of business impacts. If the POHS metadata suggests that the inference method measures are above predetermined thresholds, process 1600 can continue to step 1606 where a formal review by the stakeholders takes place, using the POHS GUI at step 1608. Upon approval from the stakeholders, the process 1600 can continue to step 1610 where innate inference theorem provers validate the innate inference knowledge base. Then process 1600 can continue to step 1612 where the logical consistency of the POHS innate inference faculty is verified using specific testing. If POHS innate inference is inconsistent from the promoted inference methods, then the process 1600 can continue to step 1614, where the promoted inference methods are withdrawn from the promotion, thereby continuing to step 1616 to end the promotion process.

Alternately if the POHS innate inference faculty is consistent with step 1612, then the process 1600 can continue to step 1618 where theorem prover results from step 1610 that indicated logical refinements, such as redefinition of logical quantifiers or refinement of replacement rules (e.g., exportation/tautology) are evaluated for refinement. If the refinements are acceptable, then process 1600 can continue to step 1628, where the extensions applied to the innate inference validate inference streams. Then process 1600 can continue to the step 1530 where the extended innate inference faculty inference streams are tested and results are cataloged. Then process 1600 can continue to the step 1632 where the testing results are reviewed and, if the review is acceptable, process 1600 can continue to the step 1624 where POHS KB and associated metadata are committed to use updated POHS innate inference faculty. Then process 1600 can end at step 1626 where the updated POHS innate inference faculty is available. Alternately if the review from step 1632 indicated non-acceptance of the testing results, process 1600 can continue to the step 1634 where an exception report to the initial POHS review from step 1602 is compiled. An example of an exception report can be an error report for record keeping or metadata purpose. Then process 1600 can continue to step 1614. Alternately, if at step 1618 it is determined that the innate inference facility do not need any logical extensions, then process 1600 can continue to the step 1620 where existing innate inference faculty inference streams are tested and results are cataloged. The process 1600 can then continue to the step 1622.

Figure 17:
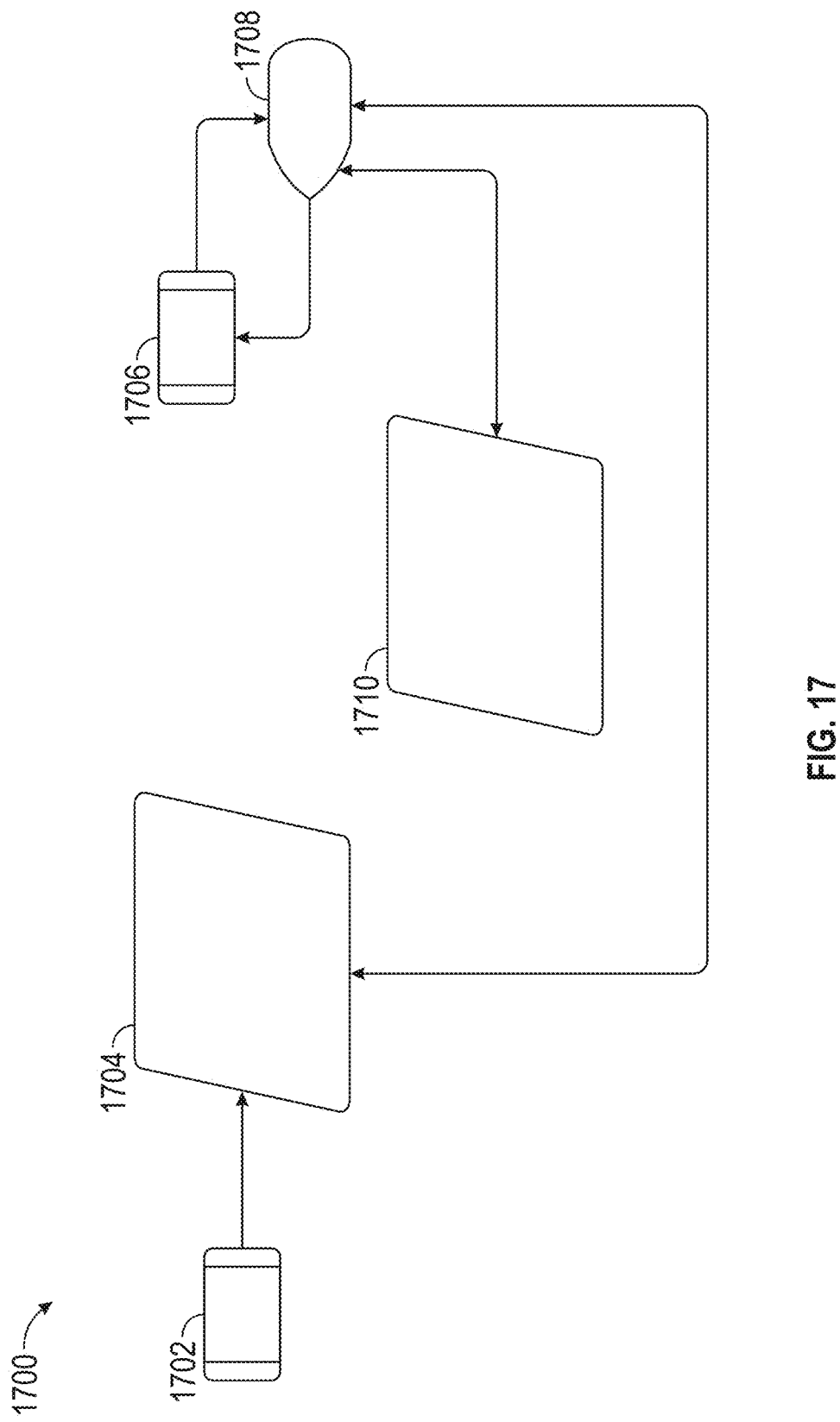
FIG. 17 depicts a diagram of an illustrative embodiment of a process for managing viewpoints of an interactive visual framework.

Turning to FIG. 17 the process 1700 can be used to manage POHS dimensions (or viewpoints). POHS dimensions are designed to help review how algorithmic decision steps are composed, such as what data concepts are used in identifying them, how they are used in managing the hypotheses characteristics, extent of transformations and/or limitations that the training data were subjected to and any other business or operational conditions that may not be directly captured in the data itself, such as COVID-19 related disruptions to businesses, etc. Given this rich and useful context, stakeholders will be able to examine the algorithmic decision steps in a consistent (or compliant) manner. The creators (automatic or manual) of dimension (or viewpoint) values will assign prioritization/relevance/importance scores to them. However, to facilitate visual examination of the learned knowledge, each dimension is normalized so that relative impact of dimension values on the inferences will become apparent. Through added metadata, stakeholders will have the ability to reason on the algorithmic decision steps from multiple point of views, thereby improving the impact of their use. An example of normalization is provided using the Data Concepts dimension (or viewpoint) and similar approach can be used for other dimensions.

The normalization measures are created as illustrated in process 1700 for Data Concepts and Hypotheses Characteristics dimensions. The dimension values are automatically generated by the ML algorithms and proof-systems. The process 1700 begins at step 1702 where novel ML algorithms collect various measures as they identify correlations of input data in support of target hypotheses. This set includes specific input training data attributes, ranges of values or values for each attribute such that a collection of correlation set maps to outcomes of interest. Moreover selected input training data attributes can also relate to or combined with each other using logical connectives, such as and, or, etc., in indicating the correlation. Then the process 1700 can continue to step 1704, where the ML algorithm generated POHS dimension values are persisted. The process then can continue to step 1706 where the normalization factors are defined and adjusted, using the POHS GUI at step 1708 and governed normalization factors from the step 1710.

Figure 18:
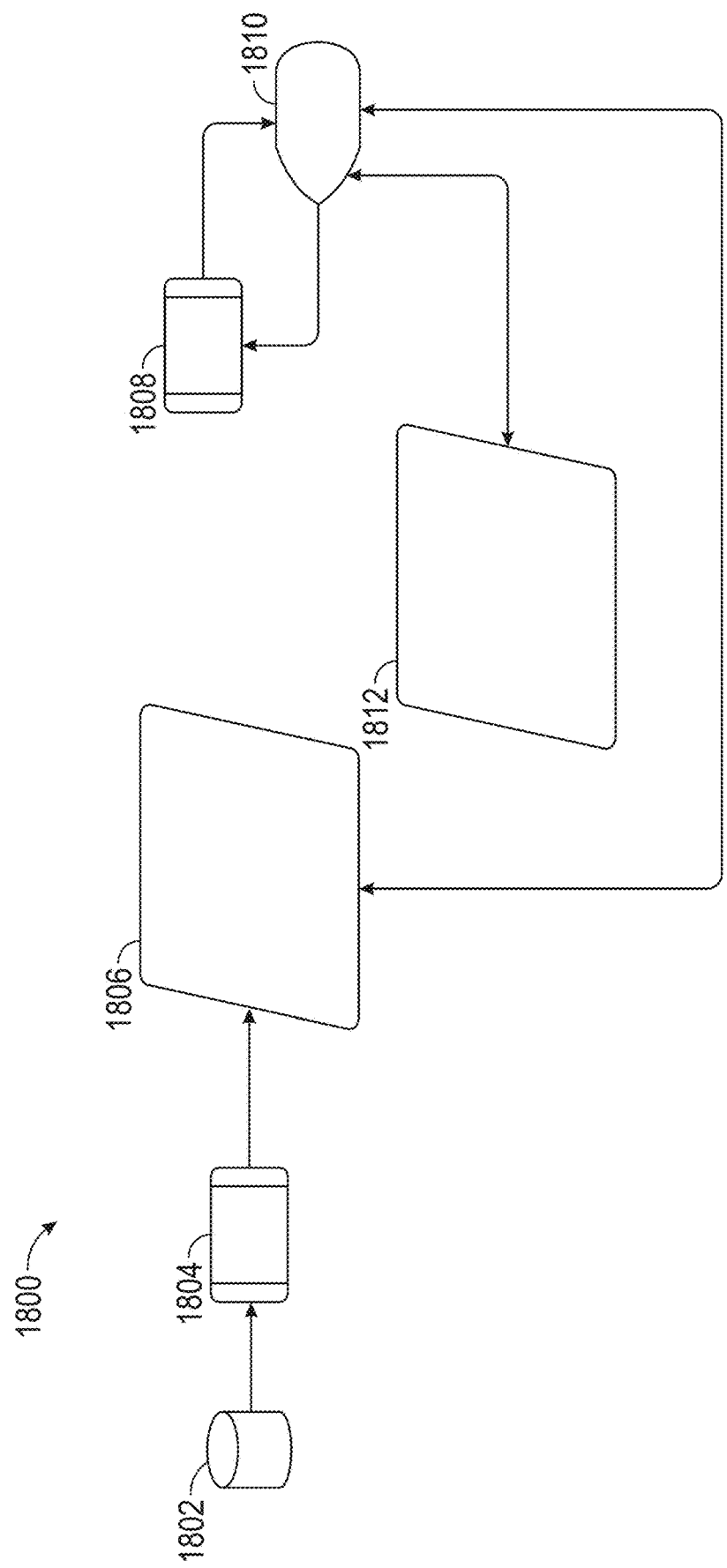
FIG. 18 depicts a diagram of an illustrative embodiment of another process for managing viewpoints of an interactive visual framework.

Turning to FIG. 18 the process 1800 can be used to manage POHS dimension related to training data alterations. Data Alteration dimension will be automated where feasible by sourcing transformation metadata from upstream applications that manage data infrastructure. Since not all data transformation has metadata associated, on demand incorporation of data alteration dimension values is enabled. In addition to the mandatory POHS dimensions, businesses are able to add dimensions that are specific to them, thereby improving the ability to manage algorithmic decisions.

The process 1800 begins with the step 1802, where external Extract, Transform and Load metadata is gathered and a lineage to input training data attributes are compiled. This metadata informs how data from initial creation is transformed, including filters applied. Then the process 1800 can continue to step 1804, where data alteration dimension values are standardized, using configurable rules. The inputs to the configurations are expected to evolve and customize to enterprises. For example, if an enterprise uses some business domain values to optimize data storage such as database partition or use standard date values to represent infinite end date, they may evolve and also be codified to suit underlying technologies. Configurations for the standardization process can then be specific to businesses. Then the process 1800 can continue to step 1806 where the standardized data alteration dimension values are persisted. Then the process 1800 can continue to step 1808 where the data alteration dimension values are reviewed and normalized using the POHS GUI from step 1810 and governed data alteration POHS values and normalization factors from step 1812.

An example of the normalization is illustrated in FIG. 19, where one example from each of dimension (or viewpoint) is provided. While the Data Concepts and Data Alterations typically are assigned at Data Attribute level, Hypotheses Characteristics are assigned at a macro level of inference methods and inferencestreams. The normalization range allows the use of relative relevance of that dimension value in making the inference. For example, if an attribute has higher information gain to contribute to the correlation set, then the higher value is used to visually indicate its role.

Figure 20:
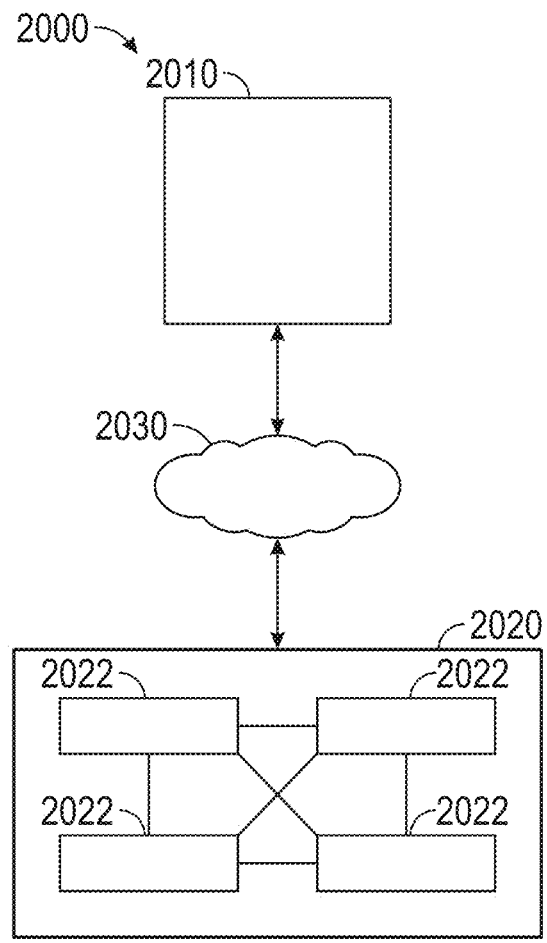
FIG. 20 depicts a diagram of an embodiment of an environment in which systems and/or methods described herein may be implemented.

FIG. 20 is a diagram of an embodiment of an environment 2000 in which systems and/or methods may be implemented as illustrated. The environment 2000 may include a user device 2010, a platform 2020, a computing resource 2022, and a network 2030. The devices of environment 2000 may be interconnected via wired connections, wireless connections, or a combination of wired and wireless connections.

User device 2010 can include one or more devices capable of receiving, generating, storing, processing, and/or providing information associated with a software environment. For example, user device 2010 may include a laptop computer, desktop computer, a computing device, a server, a group of servers, and/or the like. In some embodiments, user device 2010 may be implemented in a cloud environment. For example, user device 2010 may be implemented by one or more computer devices of a cloud computing environment or a data center.

Platform 2020 can include one or more devices capable of receiving, generating, storing, processing, and/or providing information associated with machine learning model analysis. For example, platform 2020 may include a server, a group of servers, and/or the like. In some embodiments, platform 2020 may be partially or entirely implemented in a cloud computing environment.

A cloud computing environment can include an environment that delivers computing as a service, whereby shared resources, services, etc. may be provided to user device 2010 and/or platform 2020. A cloud computing environment may provide computation, software, data access, storage, and/or other services that do not require end-user knowledge of a physical location and configuration of a system and/or device that delivers the services.

The number and arrangement of devices and networks illustrated in FIG. 20 are provided as an example. In practice, there may be additional devices and/or networks, fewer devices and/or networks, or differently arranged devices and/or networks than those shown in FIG. 20. Furthermore, two or more devices shown in FIG. 20 may be implemented within a single device, or a single device shown in FIG. 20 may be implemented as multiple, distributed devices. Additionally, or alternatively, a set of devices (e.g., one or more devices) of environment 2000 may perform one or more functions described as being performed by another set of devices of environment 2000.

Figure 21:
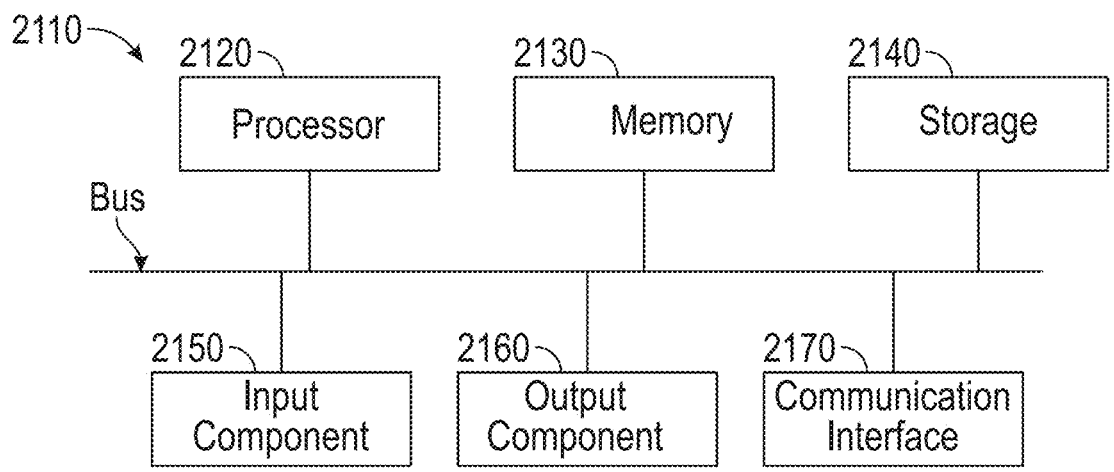
FIG. 21 depicts a diagram of example components of one or more devices of FIG. 20.

Turning to FIG. 21, a block diagram of example components of a device 2100 is shown. The device 2100 may correspond to the user device 2010 and/or computing resource 2022. In some embodiments, the user device 2010 and computing resource 2022 may include one or more devices 2100 and/or one or more components of the device 2100. As shown in FIG. 21, the device 2100 may include a bus 2110, a processor 2120, a memory 2130, a storage component 2140, an input component 2150, an output component 2160, and a communication interface 2170. Bus 2110 includes a component that permits communication among the components of device 2100. Processor 2120 is implemented in hardware, firmware, or a combination of hardware and software. The processor 2120 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some embodiments, the processor 1920 includes one or more processors capable of being programmed to perform a function. Memory 2130 includes a random-access memory (RAM), a read only memory (ROM), and/or another type of dynamic or static storage device (e.g., a flash memory, a magnetic memory, and/or an optical memory) that stores information and/or instructions for use by processor 2120.

Storage component 2140 stores information and/or software related to the operation and use of device 2100. For example, storage component 2140 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 2150 includes a component that permits the device 2100 to receive information, such as via user input (e.g., a control bar, a touch screen display, a keyboard, a keypad, a mouse, a button, a switch, and/or a microphone). Additionally, or alternatively, input component 2150 may include a sensor for sensing information (e.g., a global positioning system (GPS) component, an accelerometer, a gyroscope, and/or an actuator). Output component 2160 includes a component that provides output information from device 2100 (e.g., a display, a speaker, and/or one or more light-emitting diodes (LEDs)).

Communication interface 2170 includes a transceiver-like component (e.g., a transceiver and/or a separate receiver and transmitter) that enables device 2100 to communicate with other devices, such as via a wired connection, a wireless connection, or a combination of wired and wireless connections. Communication interface 2170 may permit device 2100 to receive information from another device and/or provide information to another device. For example, communication interface 2170 may include an Ethernet interface, an optical interface, a coaxial interface, an infrared interface, a radio frequency (RF) interface, a universal serial bus (USB) interface, a Wi-Fi interface, a cellular network interface, or the like.

Device 2100 may perform one or more processes described herein. Device 2100 may perform these processes based on the processor 2120 executing software instructions stored by a non-transitory computer-readable medium, such as memory 2130 and/or storage component 2140. A computer-readable medium is defined herein as a non-transitory memory device. A memory device includes memory space within a single physical storage device or memory space spread across multiple physical storage devices.

Software instructions may be read into memory 2130 and/or storage component 2140 from another computer-readable medium or from another device via communication interface 2170. When executed, software instructions stored in memory 2130 and/or storage component 2140 may cause processor 2120 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 21 are provided as an example. In practice, device 2100 may include additional components, fewer components, different components, or differently arranged components than those shown in FIG. 21. Additionally, or alternatively, a set of components (e.g., one or more components) of device 2100 may perform one or more functions described as being performed by another set of components of device 2100.

Moreover, for the purposes of the present disclosure, the term "a" or "an" entity refers to one or more of that entity. As such, the terms "a" or "an," "one or more," and "at least one" can be used interchangeably herein.

All numeric values herein are assumed to be modified by the term "about," whether or not explicitly indicated. For the purposes of the present invention, ranges may be expressed as from "about" one particular value to "about" another particular value. It will be understood that the endpoints of each of the ranges are significant both in relation to the other endpoint and independently of the other endpoint. When a value is expressed as an approximation by use of the antecedent "about," it will be understood that the particular value forms another embodiment.

Additionally, the section headings herein are provided for consistency with the suggestions under 37 C.F.R. § 1.77 or to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that particular technology is prior art to any embodiment(s) in this disclosure. Neither is the "Summary" a characterization of the embodiment(s) outlined in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure. Such claims accordingly define the embodiment(s) and their equivalents that are protected thereby. In all instances, the scope of such claims shall be considered on their own merits in light of this disclosure but should not be constrained by the headings set forth herein.

Moreover, the Abstract is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the preceding Detailed Description, it can be seen that various features may be grouped in a single embodiment to streamline the disclosure. This method of disclosure is not to be interpreted as reflecting an intention that the claimed embodiments require more features than are expressly recited in each claim. Instead, as the claims reflect, the inventive subject matter lies in less than all features of a single disclosed embodiment. Thus, the following claims are incorporated into the Detailed Description, with each claim standing on its own as a separate embodiment.

What is claimed is:

1. A method for generating an interactive visual framework to examine algorithmic decision making of a machine learning model making an inference as a function of captured sensor information, the method comprising:
   receiving a set of data related to one or more scenarios, the set of data having data attributes associated with a plurality of parameters;
   receiving a set of user inputs describing the set of data;
   identifying, via a machine learning algorithm, one or more sets of patterns in the data attributes, wherein the machine learning algorithm maps subsets of the data attributes to one or more outcomes of the one or more scenarios;
   assigning, via the machine learning algorithm, a plurality of dimension values to each identified set of patterns, wherein the plurality of dimension values comprises a first dimension value, a second dimension value, and a third dimension value;
   identifying, via the machine learning algorithm, a first set of patterns in the set of user inputs, wherein the machine learning algorithm maps the first dimension values to the first set of patterns;
   identifying, via the machine learning algorithm, a second set of patterns in methods used by the machine learning algorithm in identifying the one or more sets of patterns in the data attributes, wherein the machine learning algorithm maps the second dimension values to the second set of patterns;
   identifying, via the machine learning algorithm, a third set of patterns in the methods used by the machine learning algorithm in connecting the one or more sets of patterns in the data attributes to the one or more outcomes, wherein the machine learning algorithm maps the third dimension values to the third set of patterns;
   generating, via the machine learning algorithm, a machine learning model based on the patterns identified by the machine learning algorithm, wherein the machine learning model comprises sets of metadata, and wherein the machine learning model identifies correlations and sequences of one or more sets of metadata that represent a combination of decision steps leading to the one or more scenarios;
   generating one or more nodes from the sets of metadata for each decision step, wherein each node is associated with at least one dimension value of the plurality of dimension values;
   generating a connection between nodes based on the third dimension values mapped to the third set of patterns;
   generating the interactive visual framework, wherein the interactive visual framework comprises a chart having multiple axes, and wherein the first dimension values represent a first axis, the second dimension values represent a second axis, and the third dimension values represent a third axis;
   placing each node in the interactive visual framework based on the associated dimension values;
   normalizing and displaying the associated dimension values, wherein the normalized first dimension values explain transformations of the set of data prior to the machine learning algorithm identifying the one or more sest of patterns, and the normalized second dimension values explain transformations applied to the set of data within the machine learning algorithm;
   displaying a connection between nodes based on the normalized third dimension values to show a transition of decision steps in arriving at an outcome, wherein the normalized third dimension values explain how the machine learning model combines decision steps,
   receiving changes to metadata of the machine learning model; and
   in response to receiving the changes to the metadata of the machine learning model, regenerating the interactive visual framework based on the changes to the metadata, comprising:
      renormalizing the associated dimension values, based on the changes to the metadata; and
      replacing and redisplaying each node in the regenerated interactive visual framework based on the renormalized associated dimension values.

2. The method of claim 1, wherein a first machine learning algorithm and a second machine learning algorithm identify one or more sets of patterns in the attributes, further wherein the first machine learning algorithm generates a first machine learning model, and the second machine learning algorithm generates a second machine learning model.

3. The method of claim 2, wherein a third machine learning algorithm identifies patterns in the attributes, further wherein the third machine learning algorithm generates a third machine learning model.

4. The method of claim 3, further comprising:
   after generating the first machine learning model, the second machine learning model, and the third machine learning model, collecting the sets of metadata of each machine learning model in a machine learning model ecosystem;
   after selecting a placed node or a connection, receiving changes to the associated dimension values; and
   automatically generating a revised interactive visual framework based on the received changes.

5. The method of claim 1, wherein the first dimension values are data alterations, the second dimension values are data concepts, and the third dimension values are hypotheses characteristics.

6. The method of claim 1, further comprising:
   after generating the interactive visual framework, identifying a desired outcome based on a collection of nodes interconnected with markings;
   receiving a notification concerning an inconsistency with the metadata associated with the collection of nodes; and
   generating a second marking reflecting the inconsistency.

7. The method of claim 1, wherein the plurality of dimension values further comprises a fourth dimension value, the method further comprising, after identifying the third set of patterns:

identifying, via the machine learning algorithm, a fourth set of patterns in the user inputs, wherein the machine learning algorithm maps the fourth dimension values to the fourth set of patterns, wherein the fourth dimension values explain additional aspects of the transformations applied to the set of data when selecting a placed node, and wherein the fourth dimension values explain additional aspects of how the machine learning model combines decision steps.

8. The method of claim 7, wherein generating the interactive visual framework includes:
selecting up to three of the dimension values to represent the axes on the chart.

9. The method of claim 1, wherein identifying one or more sets of patterns in the data attributes includes associating an identification procedure with each set of identified patterns, and wherein the identification procedure is presented on the interactive visual framework.

10. The method of claim 1, wherein the method further comprises generating the interactive visual framework, based at least in part on an algorithmic decision derived as a function of sensor information from the machine learning algorithm, wherein the machine learning algorithm is trained based at least in part with training data having attributes comprising at least one of: speed or direction information, wherein the speed or direction information is received with the sensor information captured from an inertial measurement unit.

11. A non-transitory computer readable medium for storing instructions that when executed by one or more processors cause the one or more processors to:
receive a set of data related to one or more scenarios, the set of data having data attributes that comprise captured sensor information, wherein the data attributes are associated with a plurality of parameters;
receive a set of user inputs describing the set of data;
identify, via a machine learning algorithm, one or more sets of patterns in the data attributes, wherein the machine learning algorithm maps subsets of the data attributes to one or more outcomes of the one or more scenarios, based at least in part on the captured sensor information;
assign, via the machine learning algorithm, a plurality of dimension values to each identified set of patterns, wherein the plurality of dimension values comprises a first dimension value, a second dimension value, and a third dimension value;
identify, via the machine learning algorithm, a first set of patterns in the set of user inputs, wherein the machine learning algorithm maps the first dimension values to the first set of patterns;
identify, via the machine learning algorithm, a second set of patterns in methods used by the machine learning algorithm in identifying the one or more sets of patterns in the data attributes, wherein the machine learning algorithm maps the second dimension values to the second set of patterns;
identify, via the machine learning algorithm, a third set of patterns in the methods used by the machine learning algorithm in connecting the one or more sets of patterns in the data attributes to the one or more outcomes, wherein the machine learning algorithm maps the third dimension values to the third set of patterns;
generate, via the machine learning algorithm, a machine learning model based on the patterns identified by the machine learning algorithm, wherein the machine learning model comprises sets of metadata, and wherein the machine learning model identifies correlations and sequences of one or more sets of metadata that represent a combination of decision steps leading to the one or more scenarios;
generate one or more nodes from the sets of metadata for each decision step, wherein each node is associated with at least one dimension value of the plurality of dimension values;
generate a connection between nodes based on the third dimension values mapped to the third set of patterns;
generate an interactive visual framework, wherein the interactive visual framework comprises a chart having multiple axes, and wherein the first dimension values represent a first axis, the second dimension values represent a second axis, and the third dimension values represent a third axis;
place each node in the interactive visual framework based on the associated dimension values;
normalize and display the associated dimension values, wherein the normalized first dimension values explain transformations of the set of data prior to the machine learning algorithm identifying the one or more sets of patterns, and the normalized second dimension values explain transformations applied to the set of data within the machine learning algorithm;
display a connection between nodes based on the normalized third dimension values to show a transition of decision steps in arriving at an outcome, wherein the normalized third dimension values explain how the machine learning model combines decision steps;
receive changes to metadata of the machine learning model; and
in response to receipt of the changes to the metadata of the machine learning model, regenerate the interactive visual framework based on the changes to the metadata, comprising:
renormalize the associated dimension values, based on the changes to the metadata; and
replace and redisplay each node in the regenerated interactive visual framework based on the renormalized associated dimension values.

12. The non-transitory computer readable medium of claim 11, wherein a first machine learning algorithm and a second machine learning algorithm identify one or more sets of patterns in the attributes, further wherein the first machine learning algorithm generates a first machine learning model, and the second machine learning algorithm generates a second machine learning model.

13. The non-transitory computer readable medium of claim 12, wherein a third machine learning algorithm identifies patterns in the attributes, further wherein the third machine learning algorithm generates a third machine learning model.

14. The non-transitory computer readable medium of claim 13,
wherein the non-transitory computer readable medium stores additional instructions that, when executed by the one or more processors, cause the one or more processors to:
after generation of the first machine learning model, the second machine learning model, and the third machine learning model, collect the sets of metadata of each machine learning model in a machine learning model ecosystem;
after selection of a placed node or a connection, receive changes to the associated dimension values; and automatically generate a revised interactive visual framework based on the received changes.

15. The non-transitory computer readable medium of claim 11, wherein the first dimension values are data alterations, the second dimension values are data concepts, and the third dimension values are hypotheses characteristics.

16. The non-transitory computer readable medium of claim 11, wherein the non-transitory computer readable medium stores additional instructions that, when executed by the one or more processors, cause the one or more processors to:
- after generation of the interactive visual framework, identify a desired outcome based on a collection of nodes interconnected with markings;
- receive a notification concerning an inconsistency with the metadata associated with the collection of nodes; and
- generate a second marking reflecting the inconsistency.

17. The non-transitory computer readable medium of claim 11, wherein the plurality of dimension values further comprises a fourth dimension value, wherein the non-transitory computer readable medium stores additional instructions that, when executed by the one or more processors, cause the one or more processors to:
- identify, via the machine learning algorithm, a fourth set of patterns in the user inputs, wherein the machine learning algorithm maps the fourth dimension values to the fourth set of patterns, wherein the fourth dimension values explain additional aspects of the transformations applied to the set of data when selecting a placed node, and wherein the fourth dimension values explain additional aspects of how the machine learning model combines decision steps.

18. The non-transitory computer readable medium of claim 17, wherein generating the interactive visual framework includes selecting up to three of the dimension values to represent the axes on the chart.

19. The non-transitory computer readable medium of claim 11, wherein identifying one or more sets of patterns includes associating an identification procedure with each set of identified patterns, and wherein the identification procedure is presented on the interactive visual framework.

20. The non-transitory computer readable medium of claim 11, wherein further instructions are structured to cause the one or more processors to perform operations that comprise:
- train the machine learning algorithm, based at least in part, on training data that has attributes that comprise at least one of speed or direction information;
- receive the sensor information from an inertial measurement unit, wherein the sensor information comprises at least one of: speed or direction information;
- make an inference determined by the trained machine learning algorithm as a function of the sensor information received from the inertial management unit; and
- generate the interactive visual framework based on data related to the inference.

* * * * *